United States Patent
Waite et al.

(10) Patent No.: US 10,379,383 B2
(45) Date of Patent: Aug. 13, 2019

(54) MANUFACTURING PROCESS OF AN ACCOMMODATING SOFT CONTACT LENS

(71) Applicant: OneFocus Technology, LLC, Fernandina Beach, FL (US)

(72) Inventors: Steven B. Waite, Fernandina Beach, FL (US); Amitava Gupta, Roanoke, VA (US); Urban Schnell, Munchenbuschsee (CH)

(73) Assignee: ONEFOCUS TECHNOLOGY, LLC, Fernandina Beach, FL (US)

( * ) Notice: Subject to any disclaimer, the term of this patent is extended or adjusted under 35 U.S.C. 154(b) by 0 days.

(21) Appl. No.: 14/764,161

(22) PCT Filed: Jan. 30, 2014

(86) PCT No.: PCT/US2014/013859
§ 371 (c)(1),
(2) Date: Jul. 28, 2015

(87) PCT Pub. No.: WO2014/120928
PCT Pub. Date: Aug. 7, 2014

(65) Prior Publication Data
US 2015/0370093 A1    Dec. 24, 2015

Related U.S. Application Data

(60) Provisional application No. 61/758,416, filed on Jan. 30, 2013, provisional application No. 61/857,462, filed on Jul. 23, 2013.

(51) Int. Cl.
*G02C 7/04* (2006.01)
*G02C 7/08* (2006.01)
*B29D 11/00* (2006.01)

(52) U.S. Cl.
CPC ........ *G02C 7/085* (2013.01); *B29D 11/00028* (2013.01); *B29D 11/00038* (2013.01); *G02C 7/04* (2013.01); *G02C 7/041* (2013.01)

(58) Field of Classification Search
CPC ........... G02C 7/08; G02C 7/081; G02C 7/085
(Continued)

(56) References Cited

U.S. PATENT DOCUMENTS

| | | | | |
|---|---|---|---|---|
| 3,246,941 A | * | 4/1966 | Moss | G02C 7/04 351/159.02 |
| 4,477,158 A | * | 10/1984 | Grisolano | G02B 3/12 351/159.04 |

(Continued)

FOREIGN PATENT DOCUMENTS

| | | |
|---|---|---|
| JP | H09201849 | 8/1997 |
| JP | 2007047803 A | 2/2007 |

(Continued)

OTHER PUBLICATIONS

European Search Report dated Sep. 2, 2016 for European Application No. 14746249.3.

(Continued)

*Primary Examiner* — Stephone B Allen
*Assistant Examiner* — Travis S Fissel
(74) *Attorney, Agent, or Firm* — Fisherbroyles LLP; John Shimmick

(57) ABSTRACT

An accommodating contact lens module is provided for use with an accommodating contact lens. Components of the accommodating contact lens module can be manufactured and assembled with low distortion optics to provide improved vision. The module comprises a self-supporting module capable of being grasped by one of the components and placed in a mold without distorting the optical components of the module when placed. The module is compatible (Continued)

with soft contact lens materials, and compatible with soft contact lens manufacturing processes such as molding of hydrogels and silicones. The module may comprise one or more of many components that can be placed in the mold together. These components can be placed in the mold for encapsulation in order to provide accurate optical correction of the eye of the subject, for both far vision and near vision. In many embodiments, the module is inspected prior to placement in the mold.

13 Claims, 13 Drawing Sheets

(58) Field of Classification Search
USPC ............ 351/159.73, 159.02, 159.03, 159.04, 351/159.05, 159.33, 159.34, 159.18
See application file for complete search history.

(56) References Cited

U.S. PATENT DOCUMENTS

| | | | |
|---|---|---|---|
| 4,477,458 A | 10/1984 | Mora | |
| 4,512,040 A * | 4/1985 | McClure | A61F 2/1613 351/159.04 |
| 5,229,885 A | 7/1993 | Quaglia | |
| 6,054,075 A | 4/2000 | Inaba et al. | |
| 6,092,899 A | 7/2000 | Wanders | |
| 7,261,736 B1 | 8/2007 | Azar | |
| 7,322,695 B2 | 1/2008 | Wooley et al. | |
| 7,360,890 B2 | 4/2008 | Back | |
| 7,452,075 B2 | 11/2008 | Iuliano | |
| 7,503,652 B2 | 3/2009 | Menezes | |
| 7,517,084 B2 | 4/2009 | Wooley et al. | |
| 7,559,650 B2 | 7/2009 | Iuliano | |
| 7,694,464 B2 | 4/2010 | Garcia et al. | |
| 7,699,462 B2 | 4/2010 | Godoy et al. | |
| 7,810,925 B2 | 10/2010 | Evans et al. | |
| 9,910,296 B2 | 3/2018 | Harant | |
| 2003/0185662 A1* | 10/2003 | Appleton | B29D 11/00125 414/754 |
| 2007/0035050 A1* | 2/2007 | Rogers | B29D 11/00134 264/1.32 |
| 2008/0231799 A1 | 9/2008 | Iuliano | |
| 2008/0231801 A1* | 9/2008 | Iuliano | G02C 7/085 351/159.73 |
| 2010/0201009 A1 | 8/2010 | Bruce et al. | |
| 2012/0138488 A1 | 6/2012 | English et al. | |
| 2012/0268712 A1* | 10/2012 | Egan | G02C 7/085 351/159.34 |
| 2013/0194540 A1 | 8/2013 | Pugh et al. | |
| 2013/0242255 A1* | 9/2013 | Caldarise | A61F 9/0017 351/159.04 |
| 2016/0004098 A1 | 1/2016 | Waite | |
| 2016/0018671 A1 | 1/2016 | Waite | |
| 2016/0377887 A1 | 12/2016 | Waite | |
| 2017/0131570 A1 | 5/2017 | Thompson | |
| 2017/0131571 A1 | 5/2017 | Waite | |
| 2018/0173010 A1 | 6/2018 | Harant | |

FOREIGN PATENT DOCUMENTS

| | | |
|---|---|---|
| JP | 2010522352 | 7/2010 |
| JP | 2013156632 | 8/2013 |
| WO | WO-9110154 A1 | 7/1991 |
| WO | WO-2008115251 A1 | 9/2008 |
| WO | WO-2012051167 A1 | 4/2012 |
| WO | WO-2012061411 A1 | 5/2012 |
| WO | 2014117173 A2 | 7/2014 |
| WO | 2014120928 A2 | 8/2014 |
| WO | WO-2014161002 A2 | 10/2014 |
| WO | 2015095891 A1 | 6/2015 |
| WO | 2016019346 | 2/2016 |
| WO | 2016019351 | 2/2016 |
| WO | 2016019359 | 2/2016 |
| WO | 2017083770 | 5/2017 |
| WO | 2017083771 | 5/2017 |
| WO | 2017083774 | 5/2017 |
| WO | 2018089699 | 5/2018 |

OTHER PUBLICATIONS

Gulsen, et al., Ophthalmic Drug Delivery through Contact Lenses. Investigative Ophthalmology & Visual Science, Jul. 2004. 45:7; 2342-2347.
Hsu, et al., Review of ophthalmic drug delivery by contact lenses. J. Drug Del. Sci. Tech.2014. 24 (2) 123-135.
International preliminary report on patentability dated Aug. 4, 2015 for PCT/US2014/013859.
International search report and written opinion dated Jul. 17, 2014 for PCT/US2014/013859.
Kim, et al., Diamond Nanogel-Embedded Contact Lenses Mediate Lysozyme-Dependent Therapeutic Release. ACSNANO. 2014. 8:3; 2998-3005.
Yuan, et al., Ocular Drug Delivery Nanowafer with Enhanced Therapeutic Efficacy. ACSNANO. 2015. 9:2; 1749-1758.
Copending U.S. Appl. No. 15/988,738, filed May 24, 2018.
Copending U.S. Appl. No. 15/972,900, filed May 7, 2018.

* cited by examiner

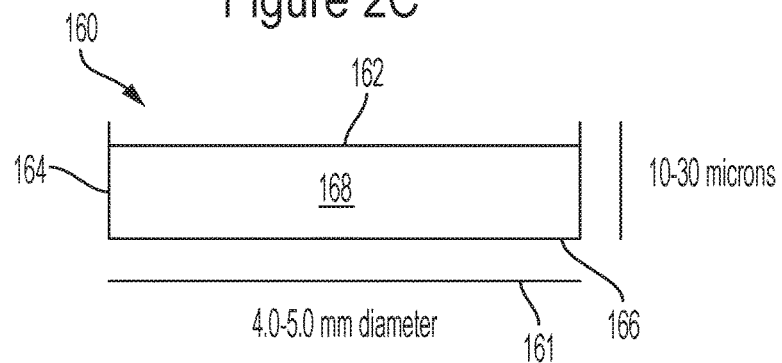
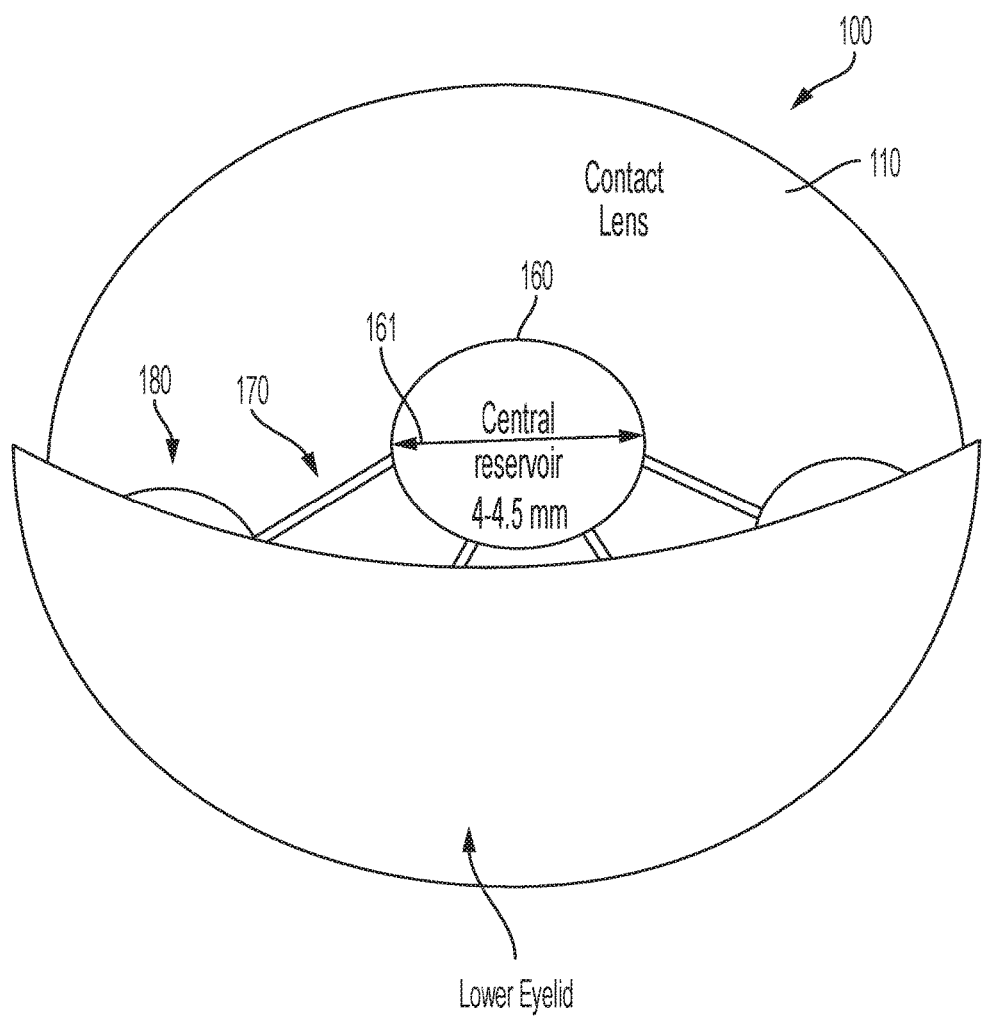

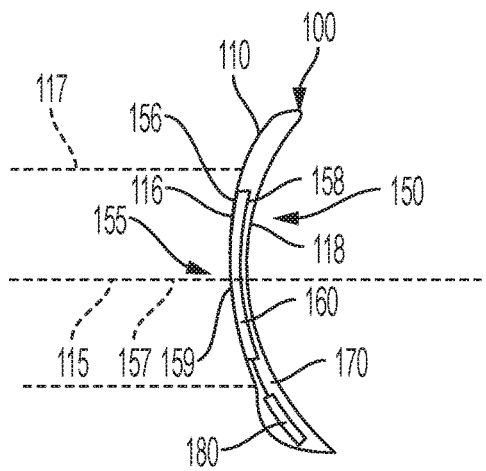
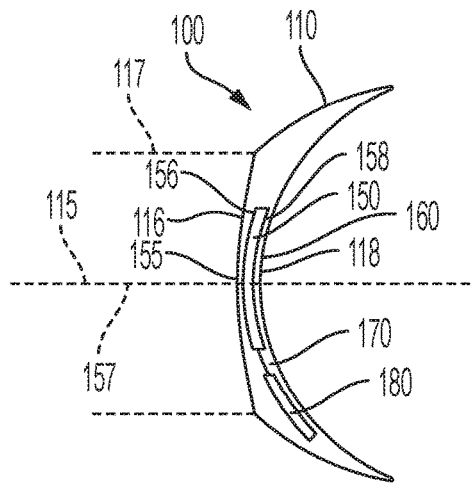
Figure 7C    Figure 7D
Figure 7E    Figure 7F

MANUFACTURING PROCESS OF AN ACCOMMODATING SOFT CONTACT LENS

CROSS-REFERENCE

This national phase application claims priority to PCT/US2014/013859, filed Jan. 30, 2014, "Manufacturing Process of an Accommodating Soft Contact Lens", which PCT application claims the benefit of U.S. Provisional Application Nos. 61/758,416, filed on Jan. 30, 2013, entitled "Manufacturing Process of an Accommodating Soft Contact Lens", and 61/857,462, filed on Jul. 23, 2013, entitled "Manufacturing Process of an Accommodating Soft Contact Lens II"; which applications are incorporated herein by reference in their entirety.

The subject matter of this patent application is related to PCT/US2014/013427, filed on Jan. 28, 2014, entitled "ACCOMMODATING SOFT CONTACT LENS", the entire disclosure of which is incorporated herein by reference.

BACKGROUND

The present invention relates generally to the treatment presbyopia.

As the eye ages, the lens of the eye become less capable of moving to provide variable optical power, a condition referred to a presbyopia. In young subjects, the lens of the eye can accommodate viewing at various distances, so that the user can be both near and far object with clear focus. However as the eye ages, the lens of the eye becomes less capable of accommodating both near and far vision and subjects with good far vision may require glasses to read close objects.

Prior methods and apparatus of treating presbyopia provide less than ideal treatment in at least some respects. Prior treatments of presbyopia include bifocal spectacles, progressive addition lenses, and multifocal contact lenses, as well as reading glasses and accommodating intraocular lenses. At least some subjects are spectacle intolerant, and spectacles can be difficult to wear in at least some situations. Multi focal lenses can degrade vision at both near and far vision at least partially in at least some instances. Intraocular lenses require surgery and can be more invasive that would be ideal in at least some instances.

Although multifocal contact lenses have been proposed, such lenses produce less than ideal results in at least some instances. Multifocal contact lenses may have two or more optical zones of different optical power. In at least some instances, one of these zones of different optical power can transmit light to the eye that is out of focus on the retina and degrades vision of the subject. Although contact lenses that translate on the cornea have been proposed in order to provide variable focus, such lenses can be somewhat difficult for subjects to use and provide less than ideal results in at least some instances. Examples of multifocal contact lenses are described in Patent Nos.: U.S. Pat. Nos. 7,517,084; 7,322,695; 7,503,652; 6,092,899; and 7,810,925, for example.

Although accommodating contact lenses have been previously proposed, the prior accommodating contact lenses can be less than ideal in at least some instances. For example, the optical properties of the prior accommodating contact lenses can be less than ideal. For example, the shape of the central shape changing region of the prior accommodating contact lenses can be somewhat distorted when the eye accommodates, and the accommodating optical zone can be somewhat smaller than would be ideal. Also, the optical zones the prior lenses can be shaped somewhat irregularly and may provide less than ideal changes in optical power. Also, the materials of the prior accommodating contact lenses can be less than ideally suited for combination with known contact lens materials, and the extent to which prior accommodating contact lenses can be worn on the eye is less than ideal in at least some instances. Accommodating contact lenses are described in WO 91/10154; U.S. Pat. Nos. 7,699,462; 7,694,464; and 7,452,075, for example.

In addition to the deficiencies noted above, work in relation to embodiments also suggests that the prior accommodating contact lenses are less than ideally suited for manufacturing, and that at least some of the prior accommodating contact lenses may be difficult to produce in large volumes in at least some instances.

Ideally, an improved accommodating contact lens will provide accommodation to the user, be easy to use, provide quality near vision, intermediate and far vision, be compatible with known safe contact lens materials, and be readily manufactured. At least some of these objectives are met with the embodiments as disclosed herein.

SUMMARY

Embodiments of the present invention provide improved methods and apparatus for manufacturing accommodating contact lenses and improved accommodating contact lenses and methods of use. In many embodiments, and accommodating contact lens module is provided for use with an accommodating contact lens. Components of the accommodating contact lens module can be manufactured and assembled with low distortion optics to provide improved vision, and the module may comprise a self-supporting free standing module capable of being grasped by one of the components and placed in a mold without distorting the optical components of the module when placed. In many embodiments, the module is compatible with soft contact lens materials, such as hydrogels and silicones, and compatible with soft contact lens manufacturing processes such as molding of hydrogels and silicones.

The module may comprise one or more of many components that can be placed in the mold together. The module may comprise one or more of an optical chamber, a support structure extending around the optical chamber, one or more eyelid engaging chambers, one or more extensions extending between the one or more eyelid engaging chambers and the optical chamber, or one or more anchors. Each of these components can be placed in the mold for encapsulation in order to provide accurate optical correction of the eye of the subject, for both far vision and near vision. In many embodiments, the module is inspected prior to placement in the mold. In many embodiments, the optical properties of the module such as optical power and change in optical power are determined prior to placement in the mold in order to provide a functional accommodating contact lens to the eye of the subject.

The components can be assembled and connected in one or more of many ways such as by welding such as laser welding or an adhesive to seal the module which may be hermetically sealed. In many embodiments, the module comprises a plurality of eyelid engaging chambers arranged for cumulative far vision, intermediate vision and near vision correction, respectively, with additional add power as the eyelid successively engages the plurality of chambers. The chambers of the module can be filled with fluid prior to placing the module in the mold, and the module can be pressurized prior to placement in the mold. The fluid can remain pressurized when the accommodating contact lens has been removed from the mold, packaged, and placed on the eye in order to increase responsiveness and inhibit hysteresis of the accommodating contact lens. In many embodiments, module comprises one or more membranes to inhibit leakage of the fluid, and the fluid is placed in the module to inhibit bubble formation, such as with degassing of the fluid prior to placement in the sealed module and orientation of the module when fluid is drawn into the module.

In many embodiments, module is encapsulated within the mold in order to inhibit optical properties of the module and correct vision of the eye. The mold may comprise a convexly curved male portion corresponding to a base curvature of the cornea of the eye and a concavely curved optically corrective female potion having a concave surface profile corresponding to a refractive error of the eye. The module can be encapsulated within the mold to form the anterior and posterior surfaces of the accommodating contact lens with shape profiles for the optical correction of the eye and for fitting the contact lens on the cornea of the eye, respectively. In many embodiments, the accommodating contact lens module comprises an optically transparent material having an index of refraction similar to the soft contact lens material such that light can be transmitted through module without introducing perceptible visual artifacts.

The module can be encapsulated in the contact lens material in one or more of many ways. In many embodiments, a precursor material is placed on the module to provide a layer of the precursor material on the module. The layer of precursor material on the module can ensure that at least a thin layer of the soft contact lens material encapsulates the module. In many embodiments, the module is wettable by the precursor material to provide the layer on the module. The surface of the module can be treated so as to comprise the wettable surface, such as with a plasma treatment to form hydroxyl groups on the surface of the module. The precursor material may comprise one or more of a monomer, a partially cured monomer, an oligomer, or a pre-polymer. In many embodiments, the module is placed in the mold with the precursor material, and the precursor material comprises an amount of viscosity sufficient to form a layer having a thickness suitable for encapsulation. In many embodiments, the precursor material is partially cured to provide the viscosity in order to form the layer with the thickness. The module may comprise a density greater than the precursor material, such that the module settles in the precursor material with the layer extending between the module and the mold. The precursor material can be cured with the layer extending between one or more surfaces of the module and the mold order to encapsulate the module and provide the encapsulating contact lens material with the thickness when worn on the eye. In many embodiments, the layer comprises a thickness sufficient to inhibit tearing of the layer away from the one or more components of the module. In many embodiments, the soft contact lens comprises an anterior layer comprising an anterior thickness on an anterior an anterior side extending between the anterior surface of the module and the anterior surface of the lens, and a posterior layer comprising a posterior thickness on posterior side extending between the posterior surface of the module and the posterior surface of the lens, in which the anterior layer is thinner than the posterior layer in order to facilitate anterior movement of the anterior membrane of the optical chamber. In many embodiments, the anterior thickness is determined at least in part by the viscosity of the precursor material, such that the precursor material can be provided with a viscosity in order to form the soft contact lens material with an appropriate anterior thickness.

The module can be placed in the mold in one or more of many ways. In many embodiments, the mold comprises a concavely curved lower female portion oriented upward in order to receive the precursor material and the module, and a convexly curved upper male portion oriented downward to fit with the female portion when the module and precursor material have been placed. In many embodiments, an anterior surface of the module is oriented downward toward the concave surface of the mold, with an anterior layer of precursor material extending between the anterior surface of the module and the concave surface of the mold. The convex surface of the male portion of the mold can be advanced toward the concave surface of the female portion into mating engagement with the female portion in order to form the posterior surface of the accommodating contact lens when the precursor material has cured.

In a first aspect, embodiments provide a method of manufacturing an accommodating contact lens. An accommodating contact lens module is provided. The accommodating contact lens module is encapsulated in a soft contact lens material.

In many embodiments, the accommodating contact lens module comprises a free standing module placed in a mold. The mold may comprise a shape to form an optical correction zone for a subject on corresponding anterior and posterior surfaces of the accommodating contact lens. The module may comprise an index of refraction similar to an index of refraction of the soft contact lens material in order to transmit light refracted by the anterior and posterior surfaces of the optical correction zone through at least a portion of the module and inhibit optical artifacts.

In many embodiments, the module is placed in the mold with a thin layer of precursor material extending between an anterior surface of a membrane of an optical correction chamber of the module and a lower concavely curved surface of the mold.

In many embodiments, the accommodating contact lens module comprises a free standing module comprising one or more of an optical chamber, a support structure, one or more eyelid engaging chambers, one or more extensions extending between the optical chamber and the one or more chambers, or an anchor. The accommodating contact lens module may comprise the free standing module comprising the optical chamber, the support structure, the one or more eyelid engaging chambers, the one or more extensions extending between the optical chamber and the one or more chambers and the anchor. The free standing module can be configured such that the optical chamber, the support structure, the one or more eyelid engaging chambers, the one or more extensions extending between the optical chamber and the one or more chambers and the anchor are connected to each other prior to placement in the mold such that the module comprises a self-supporting module capable of being lifted and placed in the mold by grasping the one or more of the optical chamber, the one or more eyelid engaging chambers, the one or more extensions extending between the optical chamber, the one or more chambers, or the anchor.

In many embodiments, the module is grasped by an end effector of a robot.

In many embodiments, the module comprises the optical chamber and the one or more eyelid engaging chambers, and the optical chamber comprises an anterior membrane having an anterior thickness and a posterior membrane having a posterior thickness, the posterior thickness greater than the anterior thickness, and wherein the one or more eyelid engaging chambers comprises an anterior membrane having an anterior membrane thickness greater than a posterior membrane thickness of the one or more chambers. An anterior surface of the anterior membrane of the optical chamber may comprise a convex curvature and a posterior surface of the posterior membrane of the one or more chambers may comprise a convex surface.

In many embodiments, the module comprises the anchor and the anchor comprises a flange comprising a plurality of openings and wherein the plurality of openings is placed in the mold.

In many embodiments, an optically transmissive coupling fluid has been placed in the accommodation module prior to encapsulating the module. The fluid may be pressurized within the module when the module has been placed in the mold.

In many embodiments, an optical chamber of the module comprises an optical power when placed in the mold, and the optical power is inhibited by the soft contact lens material with the module encapsulated within the contact lens material. The optical chamber may comprise an optically transmissive coupling fluid and the optical chamber may comprise a convexly curved anterior surface of an anterior membrane when the module has been placed in the mold. The anterior membrane may comprise an elastic deflection, and the elastic deflection may pressurize the optically transmissive coupling fluid when the module has been placed in the mold.

In another aspect, embodiments provide a method of manufacturing an accommodating contact lens module. An optical chamber is connected to one or more eyelid engaging chambers with one or more extensions extending between the optical chamber and the one or more eyelid engaging chambers.

In another aspect, embodiments provide an apparatus to manufacture an accommodating contact lens. The apparatus comprises an accommodation module and a mold.

In another aspect, embodiments provide an accommodating contact lens. The lens comprises a module encapsulated in a soft contact lens material.

In another aspect, embodiments provide a process of fabrication of a sealed fluidic module that comprises at least one central chamber and at least one peripheral chamber, connected to the central chamber by means of microchannels. The edges of the central chamber are relatively rigid and the top face of said central chamber is relatively flexible.

In many embodiments, the chamber is cylindrical in shape, with circular top face and a circular bottom face.

In many embodiments, the edges of the top and bottom faces of the central chamber of claim 1 are laser welded to the top of the edge said chamber.

In many embodiments, the peripheral chamber(s) are thermoformed, or blow molded or compression molded or injection molded.

In many embodiments, a compression molding process is used to shape the membrane used to form said top surface of said central chamber In many embodiments, the top surface of said central chamber comprises a membrane that is thinner than the membrane comprising the bottom surface.

In many embodiments, the module is filled under vacuum with a biocompatible fluid that has been previously degassed.

In many embodiments, the process comprises separate channels followed by an assembly process comprising joining all components and filling said module formed thereby with fluid.

In another aspect, embodiments provide a process of embedding the fluidic module inside the body of a soft contact lens.

In many embodiments, said contact lens is formed by polymerizing a monomer formulation by application of energy. The energy may be delivered in the form of UV radiation. The polymerization process may comprise an automated assembly of a pair of optical molds, a specified volume of monomer and the fluidic module, and a photo-curing step.

In many embodiments, the process comprises application of UV radiation in the wavelength range 300-450 nm.

In many embodiments, the monomer comprises hydrophilic components.

In many embodiments, molecular structure of the hydrophilic components comprises one or more of acrylates, methacrylates, vinyl, allyl, or other olefinic groups capable of undergoing addition polymerization.

In many embodiments, the monomer comprises components that absorb ultraviolet radiation in the wavelength range 300-450 nm.

In many embodiments, the material used in formation of said peripheral chambers are surface treated to promote adhesion to the material comprising the contact lens.

In many embodiments, the material used in the membranes is surface treated to promote adhesion to the material comprising the contact lens.

In many embodiments, said module comprises a membrane that has a contact angle with said monomer that is no more than about 30 degrees. The module may comprise a membrane that has a contact angle with the monomer of that is no more than about 15 degrees.

In many embodiments, the monomer is subjected to a pre-cure process

In many embodiments, the viscosity of said monomer is increased by no less than 25% and no more than 300% as a result of said pre-cure process.

In many embodiments, the pre cure process involves pre-polymerization of said monomer.

In many embodiments, the pre-cure process involves polymer chain growth without any gel formation.

In many embodiments, the density of said module is substantially equal to the density of the monomer.

In many embodiments, the module has a density that is no less than about 5% and no more than about 10% higher than the density of said monomer.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIGS. 2A to 2C show design of the fluidic module and chambers, in accordance with embodiments;

FIG. 3 shows a top view of the fluidic module, comprising a central chamber and several peripheral chambers, interconnected via micro-channels, upon downward gaze, in accordance with embodiments;

FIG. 7C shows a soft accommodating contact lens comprising module encapsulated in the soft contact lens material, and optical structures of the contact lens and module, in accordance with embodiments;

FIG. 7D shows an accommodating contact lens comprising a far vision correction configuration, in which the optical correction zone extends over the optical chamber and the one or more extensions, and at least partially over the one or more eye engaging chambers, in accordance with embodiments;

FIG. 7E shows the one or more eye engaging chambers in an uncompressed configuration, in accordance with embodiments;

FIG. 7F shows the one or more eye engaging chambers in a compressed configuration, in accordance with embodiments;

DETAILED DESCRIPTION

Figure 1:
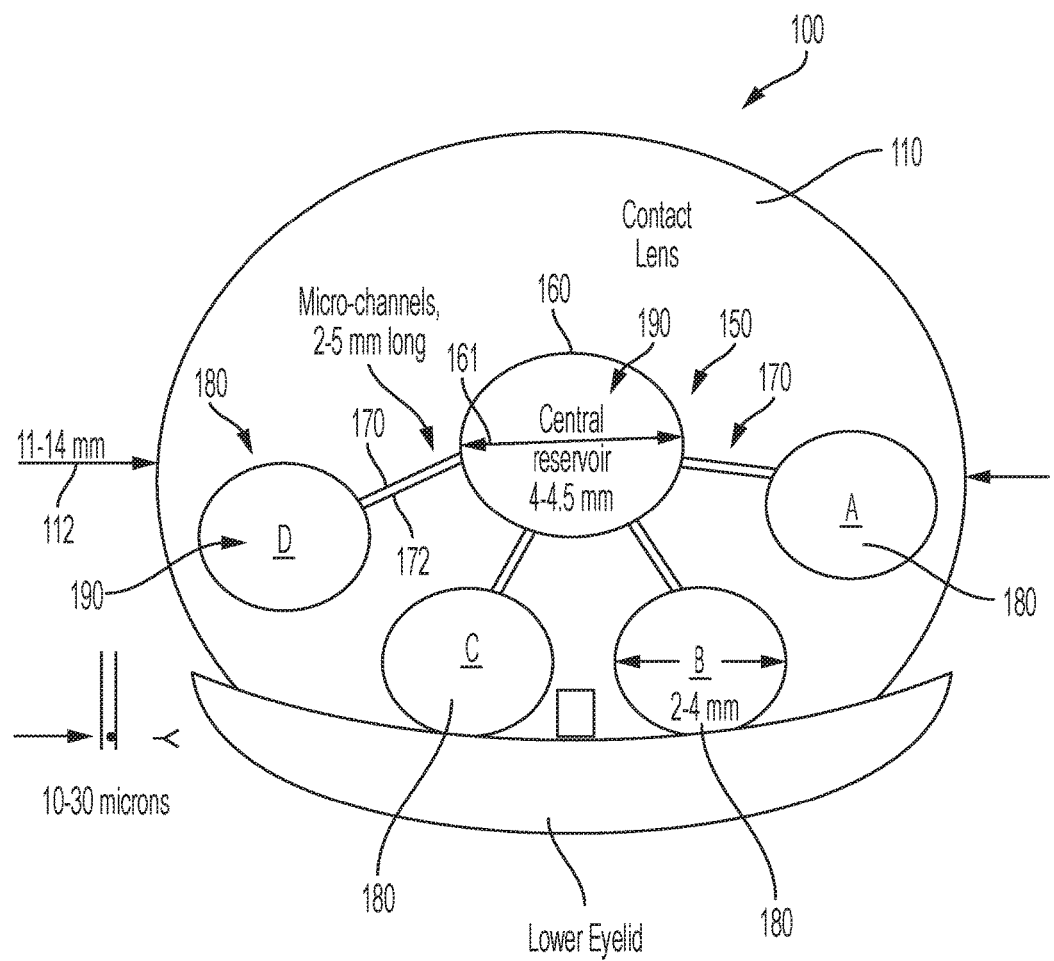
FIG. 1 shows a top view of the fluidic module embedded in a contact lens upon primary gaze, in which the fluidic module comprises a central chamber and several peripheral chambers, interconnected via micro-channels.

A better understanding of the features and advantages of the present disclosure will be obtained by reference to the following detailed description that sets forth illustrative embodiments, in which the principles of embodiments of the present disclosure are utilized, and the accompanying drawings.

Although the detailed description contains many specifics, these should not be construed as limiting the scope of the disclosure but merely as illustrating different examples and aspects of the present disclosure. It should be appreciated that the scope of the disclosure includes other embodiments not discussed in detail above. Various other modifications, changes and variations which will be apparent to those skilled in the art may be made in the arrangement, operation and details of the method and apparatus of the present disclosure provided herein without departing from the spirit and scope of the invention as described herein.

The inventors have developed solutions to the problems of the prior art and disclose herein an improved design comprising a fluidic module that may be embedded into a soft contact lens for correction of presbyopia.

The embodiments disclosed herein can be combined in one or more of many ways to provide improved accommodation of a contact lens.

As used herein like characters identify like elements.

As used herein the words "top" or "upper" encompass the anterior surface, away from the corneal surface, and the words "bottom" or "lower" encompass the posterior surface, closest to the corneal surface.

As used herein the letter "C" after a number in the context of temperature encompasses degrees Celsius and Centigrade, as will be readily understood by a person of ordinary skill in the art.

As used herein a dash "-" can be used to express a range of values, as will be readily understood by a person of ordinary skill in the art.

As used herein, the same index refraction encompasses an index of refraction close enough to another index of refraction to inhibit visual artifacts that might otherwise be perceptible to the user.

As used herein, similar index refraction encompasses an index of refraction close enough to another index of refraction to inhibit visual artifacts.

The module and manufacturing process described herein are well suited for combination with many known prior contact lenses and manufacturing processes, such that the accommodating soft contact lenses can be produced in large quantities, and are compatible with many known prior contact lens configurations and shapes. The anterior surface of the accommodating contact lens can be configured to correct refractive error of the eye such as sphere, cylinder and axis, and can be configured to correct aberrations of the eye, such as spherical aberration and coma, for example. The posterior surface of the accommodating contact lens can be configured to fit the eye with one or more of many shapes such as one or more spherical curvature profile, an elliptical profile, or a plurality of curvatures, as may be appropriate to fit one or more structures the eye such as the cornea, for example.

In many embodiments, the module comprises a stiffness greater than the soft contact lens material. The stiffness of the module can be configured in one or more of many beneficial ways to provide low distortion optics and to inhibit tearing of the contact lens material encapsulating the module, for example when the contact lens is deflected. The stiffness of the module can range from slightly stiffer than the soft contact lens material such as a hydrogel, to substantially stiffer than the encapsulating contact lens material. Although the module may comprise one or more components comprising stiffness to add rigidity, in many embodiments the module comprises both stiffness to provide low distortion optics and sufficient compliance so as to bend with encapsulating contact lens material in order to inhibit tearing of the encapsulating material away from the module.

Microfluidic Module

FIG. 1 shows a top view of a fluidic module 150, comprising a central chamber 160 and several peripheral chambers 180, interconnected via micro-channels 172, upon primary gaze, in accordance with embodiments.

In many embodiments, the design comprises a single, hermetically sealed fluidic module that comprises one or more separate chambers, interconnected by means of micro-channels, embedded in a soft contact lens, as shown in FIG. 1.

In many embodiments, the central chamber 160 is cylinder shaped with edges that are relatively stiff, its faces being covered by a relatively flexible distensible membrane. The top and bottom faces can be circular in shape.

The central chamber is connected to each of the peripheral chambers by means of a micro-channel.

Figure 2A:
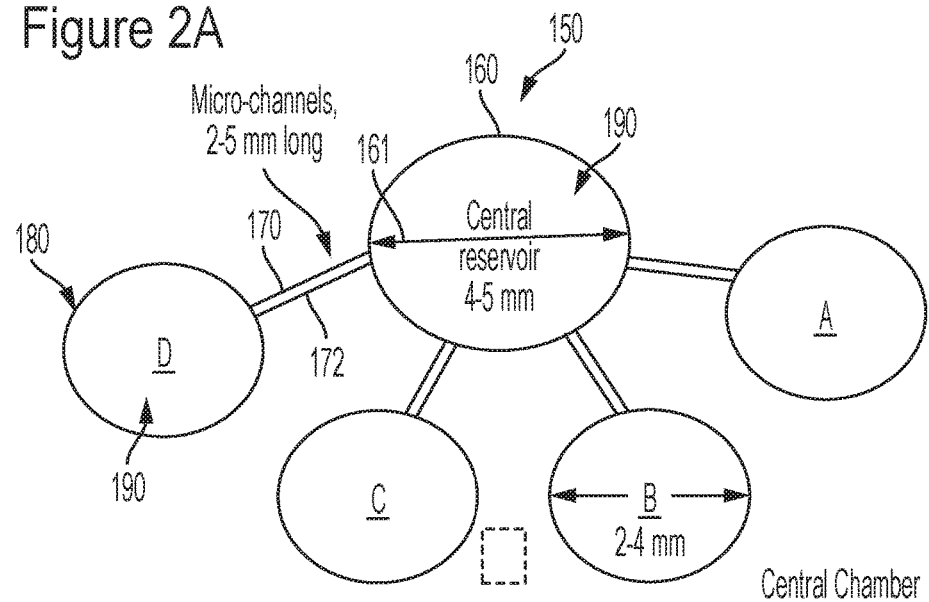
Figure 2B:
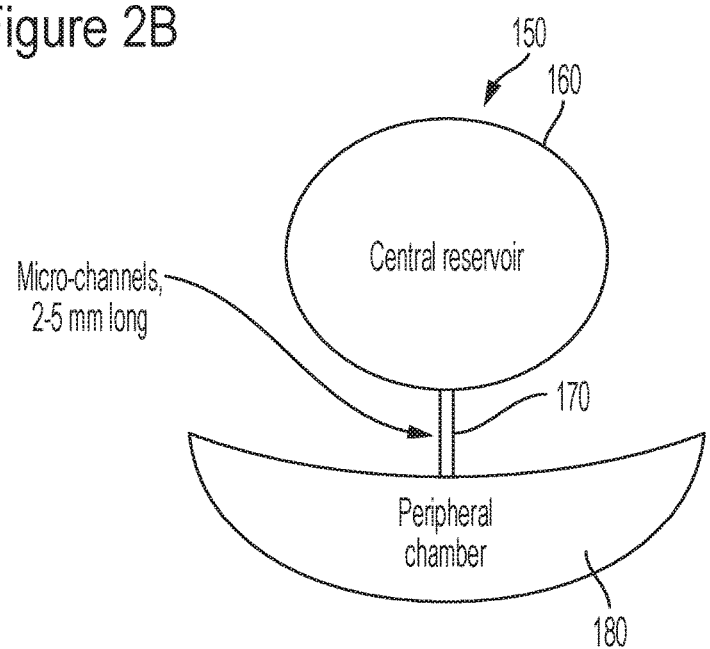

FIGS. 2A-2C show examples of fluidic modules and chambers, in accordance with embodiments.

The shape of the peripheral chambers are also cylindrical, and their top and bottom faces are circular or elongated, as shown in FIGS. 2A-2C.

The fluidic module can be located inside the soft contact lens 100 such that the geometrical center of the lens optic is co-linear with the geometrical center of the central chamber of the fluidic module.

The fluidic module can be filled with a biocompatible fluid 190, preferably of the same refractive index as the material of the soft contact lens, in the range of 1.44 to 1.55 or about 1.40 to about 1.55, for example.

The viscosity of the fluid can be in the range 0.2-2.0 centistokes at 37C, or in the range of about 0.2 to 5.0 centistokes at 37 C.

The fluid 190 is preferably a siloxane, a fluorocarbon, an ester, an ether or a hydrocarbon, or combinations thereof, for example.

The membrane is biocompatible, and has an index preferably substantially the same as the fluid and the contact lens itself, in the range 1.44-1.55, or within the range from 1.40 to 1.55, for example.

The membrane may be of the same thickness throughout, or it may have a thickness profile, contoured to control its rigidity or flexibility along the dimensions of the membrane.

The membrane is preferably a fluorocarbon, a polyester, a polyurethane, a polyether, a polyimide, a polyamide, an acrylate or methacrylate ester, or a copolymer bearing these functionalities.

The module may comprise on or more of many optically transmissive materials, such as one or more of a plastic, a polymer, a thermo plastic, a fluoropolymer a non-reactive thermoplastic fluoropolymer, or polyvinylidene difluoride (hereinafter "PVDF"), for example.

The micro-channels are fabricated from a biocompatible material, and may be a fluorocarbon, a polyester, a polyimide, a polyamide, an epoxide, an acrylate or methacrylate ester, or a hydrocarbon such as polypropylene or polyethylene.

The walls of the central chamber of the module may either be composed of the same material as the membrane on the two sides, or it may be made of a different material.

The fluidic module 150 can be embedded in the soft contact lens 100 such that the module is close to the anterior (convex) surface of the lens.

Preferably there is a thin layer of contact lens material above the fluidic module, its thickness being in the range of 5-10 microns.

Being close to the surface of the contact lens, a change in curvature of the fluidic module (caused by inflation or deflation through fluid transfer between the central and peripheral chambers) causes a corresponding change in the anterior curvature of the soft contact lens The diameter 161 of the central chamber 160 can be at least about 3 mm, for example within a range from about 3.0 to 5.0 mm, such as a range from about 3.0 to about 4.5 mm, for example within a range from about 4.0-4.5 mm, while the length of the edge can be about 10-40 microns.

The thickness of the membranes 162, 166, comprising the top and the bottom surfaces of the central chamber can be in the range 5-20 microns.

The thickness of the membrane comprising the edge 164 can be in the range 10-50 microns The peripheral chambers 180 have a total area of 5.0-8.0 mm$^2$ and a thickness of 10-30 microns each.

The total volume of the sealed module can be in the range of 0.15-0.80 mm$^3$, or 0.15-0.80 microliter, or from about 0.15 to about 2.50 mm$^3$ (about 0.15 to about 2.50 microliter), for example.

Each micro-channel can be about 10-30 microns in internal diameter and about 2-5 mm long, or from about 1 to about 5 mm long, for example.

The micro-channels may be designed to have an uniform internal diameter or it may have micro-indentations oriented to impede flow in one direction in preference to the other.

The purpose of these indentations can be to modulate the response time of the onset and removal of the additional plus power after the down-gaze.

FIG. 3 shows a top view of the fluidic module, comprising a central chamber and several peripheral chambers, interconnected via micro-channels, upon downward gaze, in accordance with embodiments.

The mechanism of action involves movement of the scleral sphere caused by down-gaze typically occurring when the wearer attempts to read or perform a near vision task.

The eyeball moves down by about 20 degrees-60 degrees, depending on the level of down-gaze, causing the corneal surface to rotate down by about 2.0 mm-6.0 mm The peripheral chambers slide under the lower eyelid and can be compressed, as shown in FIG. 3.

A 2.0 mm downward movement of the lens positioned on the cornea will cause partial (30-60%) compression, while a 4.0 mm or greater eye movement will cause the entire peripheral chamber to be compressed.

In many embodiments eyelid caused compression will be able to expel a fraction (20%-60%) of the fluid in the peripheral chamber(s) when the totality of peripheral chambers move under the lower eyelid.

The fluid moves travels through the micro-channels connected at the distal end to the central chamber, and increases the hydrostatic pressure in the central chamber.

The hydrostatic pressure being equal in all directions, causes a spherical inflation of the membrane on the top and bottom faces.

This inflation may be preferentially directed to the top surface by using a thicker membrane at the top surface, rendering it stiffer than the membrane covering the bottom surface of the central chamber In some embodiments, the hydrostatic pressure may be equal in all directions, and consequently causes a spherical inflation of the membrane on the top and bottom faces.

In many embodiments, the relative extent of inflation of the top and the bottom faces can be adjusted by adjusting the thickness of the membranes covering the top and bottom faces and providing an accommodating module having an appropriate thickness of each of the top and bottom membranes.

Similarly, the edge can be rendered less distensible by using a relatively thick walled membrane for its fabrication.

In many embodiments, a 2.0 D increase in power can be achieved by a 5.0-7.0 micron sag height change of the anterior (top) surface of the central chamber, when the central chamber is within a range from about 3.0 mm to about 5.0 mm, for example about 4.0 mm in diameter. Alternatively or in combination, a 2.0 D increase in power can be achieved by a 5.0-15.0 micron sag height change of the anterior (top) surface of the central chamber, when the central chamber is within a range from about 3.0 mm to about 5.0 mm, for example about 4.0 mm in diameter.

This change in curvature can be effected by injection of fluid of volume equal to 0.10-0.15 microliters. Alternatively or in combination, the change in curvature can be effected by injection of fluid of volume within a range from about 0.07 to about 0.21 microliters, for example.

In many embodiments, the total volume of fluid to be expelled from the peripheral chambers to the central chamber due to eyelid pressure can be within a range from about 0.10 to about 0.30 microliters. Alternatively or in combination, the total volume of fluid to be expelled from the peripheral chambers to the central chamber due to eyelid pressure can be within a range from about 0.07 to about 0.30 microliters.

As shown in FIGS. 1-3, the central optical chamber 160 comprising the reservoir is connected to the one or more eyelid engaging chambers with one or more extensions 170 comprising one or more channels 172. The one or more eyelid engaging chambers 180 may comprise a plurality of eyelid engaging chambers, such as chamber A, chamber B, chamber C and chamber D. A plurality of extensions comprising a plurality of channels connects the plurality of chambers to the central optical chamber. The micro-channels extend between the central optical chamber and each of the plurality of chambers.

The plurality of eyelid engaging chambers can be arranged in one or more of many ways. For example, the eyelid engaging chambers can be arranged to engage the eyelid sequentially, simultaneously, incrementally, or in combinations thereof, for example.

The plurality of eyelid engaging chambers can be arranged to provide incremental amounts of optical power to the central optical chamber upon increasing engagement of the lower eyelid with the plurality of chambers. In many embodiments, a first eyelid engaging chamber such as chamber B or chamber C engages the eyelid before a second eyelid engaging chamber such as chamber A or chamber D.

Engagement of the first eyelid engaging chamber can urge a first amount of fluid into the central optical chamber to provide a first amount of optical power. Engagement of the second eyelid engaging chamber can urge a second amount of fluid into the central optical chamber to provide a second amount of optical power greater than the first amount of optical power. The first amount of fluid from the first eyelid engaging chamber can be combined with the second amount of fluid from the second eyelid engaging chamber to provide the second amount of optical power greater than the first amount of optical power, for example. In many embodiments, the first amount of fluid can be combined with the second amount of fluid within the central optical chamber to provide the increased optical power.

In many embodiments, the first chamber comprises a first plurality of chambers, and the second chamber comprises a second plurality of chambers, for example. Chambers B and C may comprise a first plurality of chambers, each contributing an amount of optical power within a range from about 0.25 Diopters to about 0.75 Diopters, for example. Chambers A and D may comprise a second plurality of chambers, each contributing an amount of optical power within a range from about 0.25 Diopters to about 0.75 Diopters, for example. For example each of chambers A, B, C and D may provide about 0.5 Diopters of correction, and engagement of chambers B and C provides about 1 D of additional optical power with a first position of the lens in relation to the eyelid, and engagement of chambers A, B, C and D provides about 2 D of additional optical power with a second position of the eyelid in relation to the lens.

Manufacturing of the Fluidic Module

Figure 4:
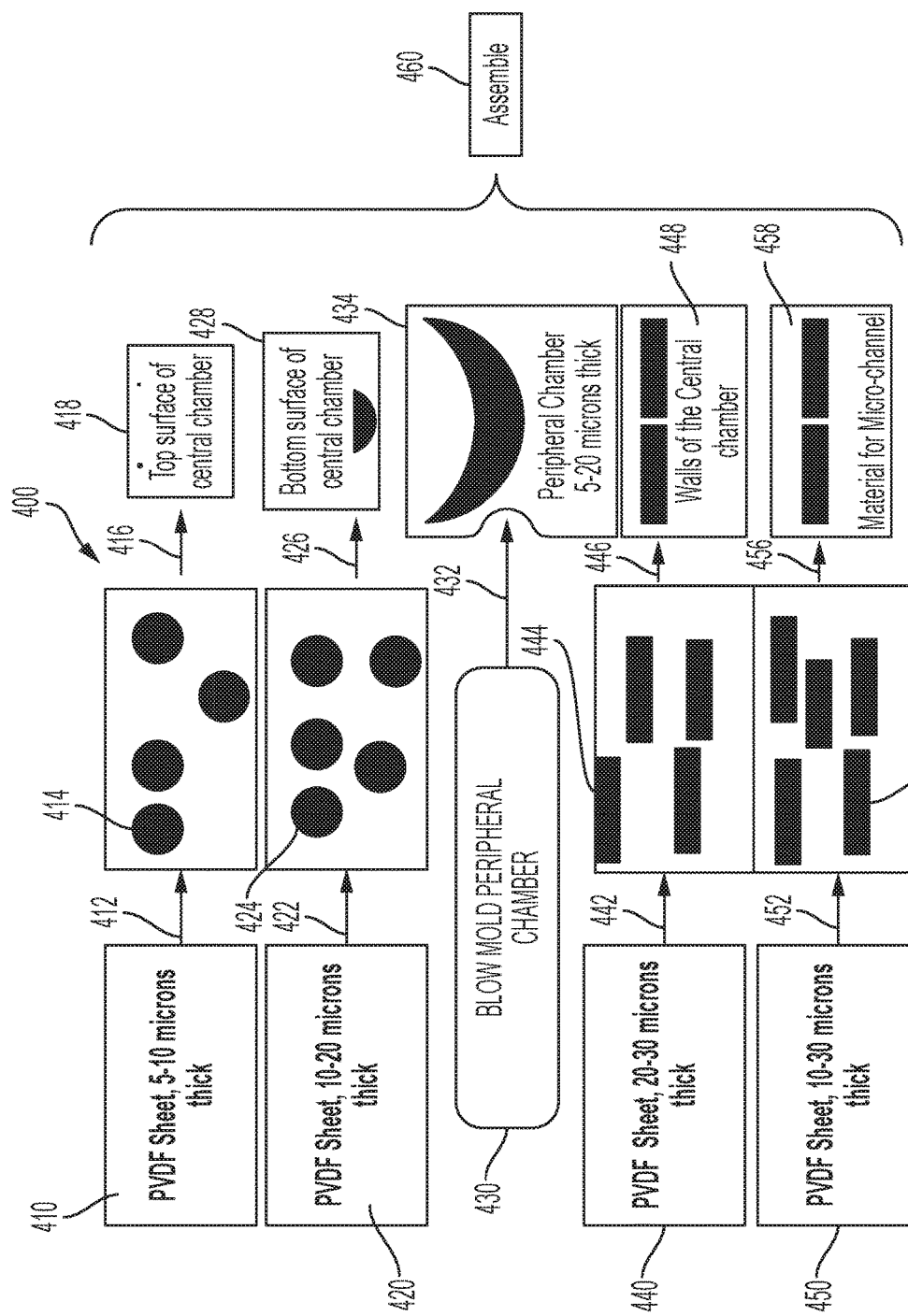
FIG. 4 shows a flow chart of assembly of the fluidic module, in accordance with embodiments.

FIG. 4 shows a flow chart of assembly of the fluidic module.

The manufacturing process 400 of this fluidic module 150 involves forming the central and the peripheral chambers as well as the micro-channels separately, then joining them in order to form the whole module, as shown in FIG. 1.

Preferably, the peripheral chambers are formed by casting, injection molding or blow molding.

Thermoplastics, preferably partially crystalline thermoplastics such as polycarbonate, polypropylene, polyethylene, polyethers, polyamides, polyimides, polyfluorocarbons such as polyvinylidene difluoride (hereinafter "PVDF"), polyvinylidene fluoride, for example commercially available Tyvek™ or Kynar™, may be used to injection mold or blow mold the chambers.

These materials have superior toughness, and many of them are biocompatible.

In many embodiments, the following steps are used for fabrication of the central optical chamber 160.

In many embodiments, the edge wall is formed first at a step 440, using a mandrel or a cylindrical mold to wrap around a thin film cut to shape at a step 442. For example, a piece of a thermoplastic cut into a strip 6.3-6.5 mm long, 20 microns wide and 5 microns in thickness is cut from a roll of this material, using a water jet or a picosecond pulsed laser, for example.

In many embodiments, this strip 444 is wrapped around a rigid mandrel of diameter 4.0 mm, and it's the free edges that overlap over a distance of 0.1-0.3 mm are sealed by a heat sealing or laser welding process at a step 446.

The mandrel may be made of a stiff, for example relatively rigid material, capable of withstanding relatively high temperatures, and should have a relatively low thermal expansion coefficient such as a high melting plastic, e.g., an aromatic polyimide, a ceramic or a metal.

In many embodiments, the cylindrical shape is removed from the mandrel after the edges have been joined, for example.

In many embodiments, the shape is placed on a flat, rigid substrate over a flat end piece made of a thermoplastic or thermoset material whose diameter is matched to the diameter of the cylinder.

In many embodiments, the edge is sealed by a laser welding or a heat sealing process, preferably acting through the rigid substrate or platform supporting the end piece.

The platform also functions as a heat sink and minimizes heat diffusion up into the wall or across the surface of the end piece.

Precise control of temperature rise away from the joint can be helpful in order to minimize heat distortion.

In many embodiments, once the end piece has been sealed to the edge of the cylinder, the piece is inverted, placed over a second end piece, then the sealing process is repeated.

In many embodiments, the micro-channels 170 are fabricated at a step 450 from thin sheets of a thermoplastic such as polyethylene, polypropylene, polyvinylidene difluoride (PVDF), Tedar™, Kynar™, Viton™, or other heat sealable or weldable materials, for example.

In many embodiments, the preferred process at a step is similar to the one used to fabricate the edge member of the central chamber 160, as described above.

At a step 452 strips 454 can be cut as described herein.

At a step 456 the strips of material can be sealed as described herein to form the extensions 170 comprising the channels as described herein.

At a step 410, the top surface of the central optical chamber 150 is made. At a step 412 PVDF sheet is cut as described herein to make the circular membrane 414. At a step 416, the circular membrane 414 is sealed on the upper rim of the extension to form upper membrane 162 of the central optical chamber.

At a step 420, the bottom surface of the central optical chamber 150 is made. At a step 422 PVDF sheet is cut as described herein to make the circular membrane 424. At a step 426, the circular membrane 424 is sealed as described herein on the upper rim of the support to form upper membrane 162 of the central optical chamber.

At a step 430, the peripheral chamber is formed by blow molding. At a step 432 the peripheral chamber is provided for assembly and may be sealed as described herein.

At a step 460 components of the module are assembled to form the module 150.

The components assembled in order to manufacture module 150 comprise a top surface of the central chamber 418, a bottom surface of the central chamber 428, a peripheral chamber 434, walls of the central chamber 448 and the micro-channel 458.

In many embodiments, the tubes forming the micro-channels 458 are next sealed on to the edges of the central chamber 448 and the peripheral chamber 180, as shown in FIG. 1.

In many embodiments, the process provides an initial step sealing the tubes edgewise onto the wall of the edges, so that a fluid tight seal is formed 360 degrees around the circumference of the micro-channels.

In many embodiments, a metal insert is then used to penetrate the wall of the edges of the central chamber and the peripheral chamber(s) in order to open a fluid path. This path is fully enlarged so that is equal to the internal diameter of the micro-channel.

In many embodiments, an inlet and an outlet port are then affixed to the wall of the peripheral chamber(s), using a process similar to the one used above.

In many embodiments, the inlet and outlet ports are tubes similar in diameter, wall thickness and length as the micro-channels, and micro-channel pieces fabricated as above may be used as inlet and outlet ports.

In many embodiments, preferably, the inlet port is attached to the peripheral chamber and the outlet port is attached to the central chamber.

Figure 5:
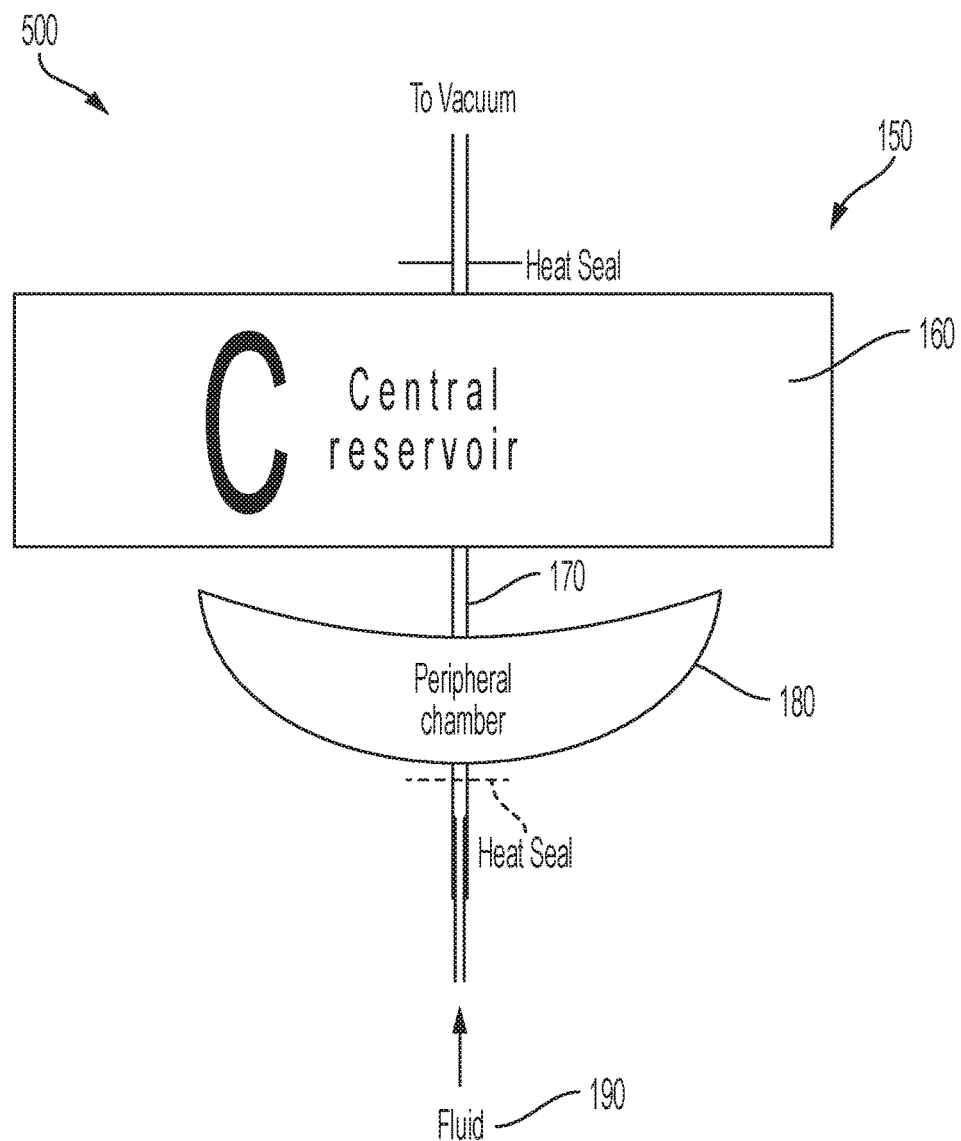
FIG. 5 shows filling and sealing of the fluidic module, in accordance with embodiments.

FIG. 5 shows a method 500 of filling and sealing of the fluidic module. In many embodiments, the assembled module is then filled with fluid, as follows.

The fluid 190 to be used to fill the module is degassed by placing it in a closed container with an opening, closing the opening with a valve, cooling the fluid down to a temperature at which the fluid freezes or to −100 C whichever is greater, then pulling vacuum through this opening so as to expel all air from the space above the fluid in the container.

The vacuum is shut off, the fluid is warmed to room temperature, then it is cooled again, before reapplying vacuum.

This process is repeated until a pressure gauge, connected to the fluid container registers no change in pressure upon application of vacuum to the container containing the fluid at a low temperature.

In many embodiments, a consideration is not to apply vacuum to the container when the fluid is at room temperature, in order to avoid evaporative losses of the fluid.

A gas tight syringe is inserted into the container, a quantity of fluid is drawn into the syringe, the tip of the syringe inserted into the inlet port affixed to the peripheral chamber.

An outlet tube, preferably made of metal is affixed to the outlet port.

The module is positioned such that the fluid inlet port is at the bottom and the outlet port is at the top.

Vacuum is pulled through the outlet tube, as the syringe is driven to inject fluid through the inlet tube.

Fluid injection is topped when the module is filled with fluid, and the fluid level reaches the outlet tube.

The inlet and the outlet tubes are then sealed off close to the edge of the wall of the chambers, leaving approximately 0.05 to 0.1 mm clearance.

The sealing process may involve application of heat, or a laser beam, for example.

The foregoing is given as an example, in accordance with embodiments, and is not intended to limit the described manufacturing and assembly process in any way.

Embedding the Microfluidic Module in a Soft Contact Lens Body

Figure 6:
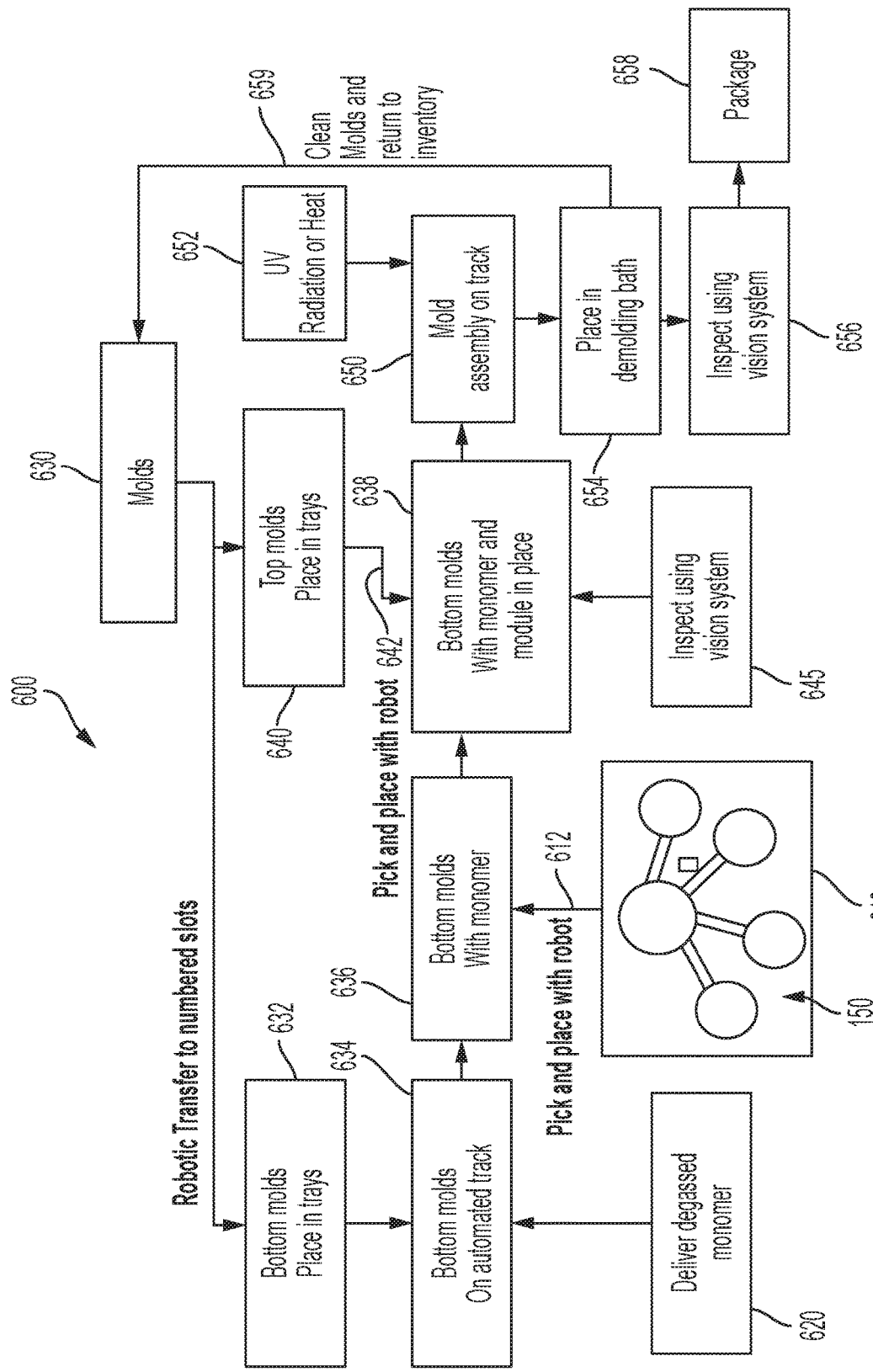
FIG. 6 shows a process of molding and forming a soft contact lens made of a hydrophilic monomer or a silicone hydrogel modified to add the inclusion of a fluidic module, fabricated as shown in FIG. 5, in accordance with embodiments.

FIG. 6 shows a method 600 of encapsulating a module 150 within contact lens material 110 to form an accommodating contact lens. While the method 600 can be performed in one or more of many ways, in many embodiments method 600 comprises modification of conventional process of molding and forming a soft contact lens made of a hydrophilic monomer or a silicone hydrogel to add the inclusion of a fluidic module, fabricated as shown in FIG. 5 and as described herein, in accordance with embodiments;

In many embodiments, after assembly, the fluidic module passes through an inspection station at a step 645 that may be automated for high volume production that comprises a vision system to check dimensions and seal integrity and an optical probe to test the optical properties of the central chamber, when the peripheral chamber is compressed.

In many embodiments, the module is then placed in a tray designed for a pick and place robot at a step 610, and delivered to the contact lens manufacturing line that may be automated for high volume production.

At a step 620, a degassed monomer can be provided.

At a step 630, molds are provided.

At a step 632, bottom molds are placed in trays.

At a step 634, bottom molds are placed on an automated track.

At a step 636, bottom molds are placed with monomer.

At a step 612, the module 150 is picked up and placed with a monomer.

At a step 640, top molds are placed in trays.

At a step 642, the top molds placed in the trays are picked up and placed with a robot.

At a step 638, bottom molds with monomer and module in place receive the top molds.

At a step 650, the assembly is molded on the track.

At a step 652, UV radiation or heat is applied to mold the assembly on the track.

At a step 654, the assembly is placed in a demolding bath.

At a step 656, the accommodating contact lenses are inspected with a vision system. In many embodiments, the optical properties of the module such as optical power and change in optical power are determined prior to placement in the mold in order to provide a functional accommodating contact lens to the eye of the subject.

At a step 658, the accommodating contact lenses are packaged.

At a step 659, the molds are cleaned and returned to inventory.

In many embodiments, the contact lens is typically made of a hydrophilic monomer or a silicone hydrogel material as described herein.

The lens may be formed, by way of example only, by cast polymerizing a monomer mixture comprising the monomer, an ultraviolet or thermal polymerization initiator and other additives such as a UV blocking agent or an antioxidant, for example.

In many embodiments, the cast molding process is generally performed by creating a cavity formed by two molds, filling this cavity(mold cavity) with a layer of the monomer formulation, then applying energy, that may be ultraviolet radiation, heat, ultrasonic energy, microwave energy, or the like to trigger the polymerization process by activating the polymerization initiator.

In many embodiments, the monomer formulation is cured by application of energy in the form of UV radiation, since a UV curing process allows better control of cure temperature and completes the cure in a shorter time.

In many embodiments, the UV radiation that is applied to initiate the curing process is in the range of 300 nm to 500 nm.

More preferably, the wavelength range is 310 nm to 450 nm.

In many embodiments, the tray comprising multiple mold assemblies, each consisting of a lower mold, a layer of monomer, the fluidic module immersed in monomer, and a top mold, is moved at a slow uniform speed along a track through a tunnel illuminated with UV radiation, provided from a bank of UV light sources placed either under and/or over the track In many embodiments, typically, the UV radiation induced cure process is completed within 30-200 seconds.

In embodiments using UV curing process, the mold through which UV radiation is transmitted is required to be transparent to UV in the wavelength range that is required to activate the UV initiator, typically 310 nm to 450 nm.

Cure process initiated by other types of energy, e.g., heat may require substantially longer cure period.

In many embodiments, the monomer is cured as in a conventional line, although it is possible that the cure time may have to be increased in order to allow of the UV blocking properties of the fluidic module.

The UV radiation may be applied from the top and the bottom in order to fully cure the monomer, forming the contact lens.

In many embodiments, the steps involving loading of the top and bottom molds in trays that move along separate paths, the delivery of the monomer into the bowl of the second mold, the placement of the upper mold into the layer of the monomer allowing it to spread and form a continuous layer of desired thickness are all automated in a high volume production line.

FIG. 6 shows how the conventional process of molding and forming a soft contact lens made of a hydrophilic monomer or a silicone hydrogel may be modified to add the inclusion of a fluidic module, fabricated as shown in FIG. 5.

In many embodiments, the sealed module is added by means of a pick and place robot to the lower mold after the monomer has been injected, so that the optical center of the central chamber is aligned with the optical center of the mold.

In many embodiments, the monomer comprises, for example consists of, hydrophilic components capable of undergoing radical induced addition polymerization, such as acrylates and methacrylates, as well as certain allyl, vinyl or styrenic compounds.

A vision system may be used to check the alignment of the fluidic module delivered into the pool of the monomer in the lower mold.

Although reference is made to a monomer, a person of ordinary skill in the art will recognize that one or more of many precursor components can be used to form the polymer in accordance with the teachings described herein, such as one or more of a monomer, an oligomer, a pre-polymer, or a composition comprising mixtures of reactive polymers with un-reacted monomers, for example.

Adjusting the Location of the Embedded Fluidic Module in the Contact Lens

In many embodiments, the density of the module and the monomer comprising the contact lens are configured, and may be approximately matched, so that the module sinks down in the monomer fluid, until it reaches the bottom mold.

In many embodiments, the surface of the module is designed to be wettable by a precursor of the soft contact lens material, and the precursor may comprise one or more of the monomer, an oligomer, or a prepolymer, for example.

Wettability encompasses, in this disclosure, the ability of the monomer fluid to at least form a stable thin film coating the surface of the module that is not displaced when the module touches the bottom of the mold cavity, in order words, the force of adhesion sustains the film thickness.

Wettability may be assured that the surface energy of the membrane comprising the module and the monomer are similar and have similar polar and dispersive components.

Wettability may be tested by measuring the contact angle of a drop of monomer placed on a flat sheet of membrane comprising the module.

In many embodiments, said contact angle is less than 30 degrees, more preferably it is less than 15 degrees.

The module settles into the monomer layer, but maintains a layer of monomer between itself and the mold, typically a thickness of 5-10 microns, depending on the weight and specific gravity of the module, the surface energy of the monomer formulation and that of the module and the mold materials, and additional attributes of the monomer formulation.

In many embodiments, the process leaves a consistently thin, continuous layer of monomer between the module and the mold, by adjusting the weight, specific gravity and the surface energy of the mold and the membrane comprising the top surface of the module.

The thickness of the film of monomer fluids can be further controlled by adjusting the viscosity of the monomer.

The viscosity of the monomer may be altered by pre-curing or pre-gelling the monomer before it is introduced into the mold cavity.

The viscosity may be increased by 25% to 300% or more by the pre-curing process.

In many embodiments, a benefit of the pre-curing process is that it leads to a thicker layer of monomer under the surface of the module, leading to a thicker layer of contact lens material over the surface of the embedded module, as helpful.

In many embodiments, another benefit of the pre-curing process is that the cure induced shrinkage of the contact lens monomer occurs predominantly or at least partially during the pre-curing process, leading to less shrinkage in the mold cavity where the cure process is completed.

In many embodiments, less shrinkage during the encapsulation process reduces development of compressive forces on the module that might otherwise lead to a change in the shape of the module.

In many embodiments, yet another benefit of the pre-curing process is to stabilize the module against displacement from the centered location inside the mold cavity during the cure process.

In many embodiments, care is taken not to create cross linking leading to gel formation in the monomer during the pre-curing process.

The pre-curing process may comprise, for example consist of, a short application of UV or thermal energy to the monomer contained in a closed vessel, purged free of oxygen or air.

In many embodiments, the completion of the pre-curing process is monitored by periodic measurement of viscosity during the pre-curing process, until the process development is completed, leading to a complete specification of pre-curing conditions.

In many embodiments a method to introduce a controlled level of pre-cure in the monomer is to pre-cure a batch of monomer, then add measured amounts of this pre-cured formulation into the raw monomer until the mixture achieves a desired level of viscosity.

It should be appreciated that the specific steps illustrated in FIGS. 4, 5 and 6 provide a particular process flow in accordance with some embodiments. The methods of FIGS. 4, 5 and 6 can be combined in one or more of many ways, and one or more each of the steps of the methods can be combined, for example. It should be appreciated that the specific steps illustrated in each of FIGS. 4, 5 and 6 provide a particular process flow according to embodiments. Other sequences of steps may also be performed according to alternative embodiments. For example, alternative embodiments of the present invention may perform the steps outlined above in a different order. Moreover, the individual steps illustrated by these figures may include multiple sub-steps that may be performed in various sequences as appropriate to the individual step.

Furthermore, additional steps may be added or removed depending on the particular applications. One of ordinary skill in the art would recognize many variations, modifications, and alternatives in accordance with the embodiments described herein.

Figure 7A:
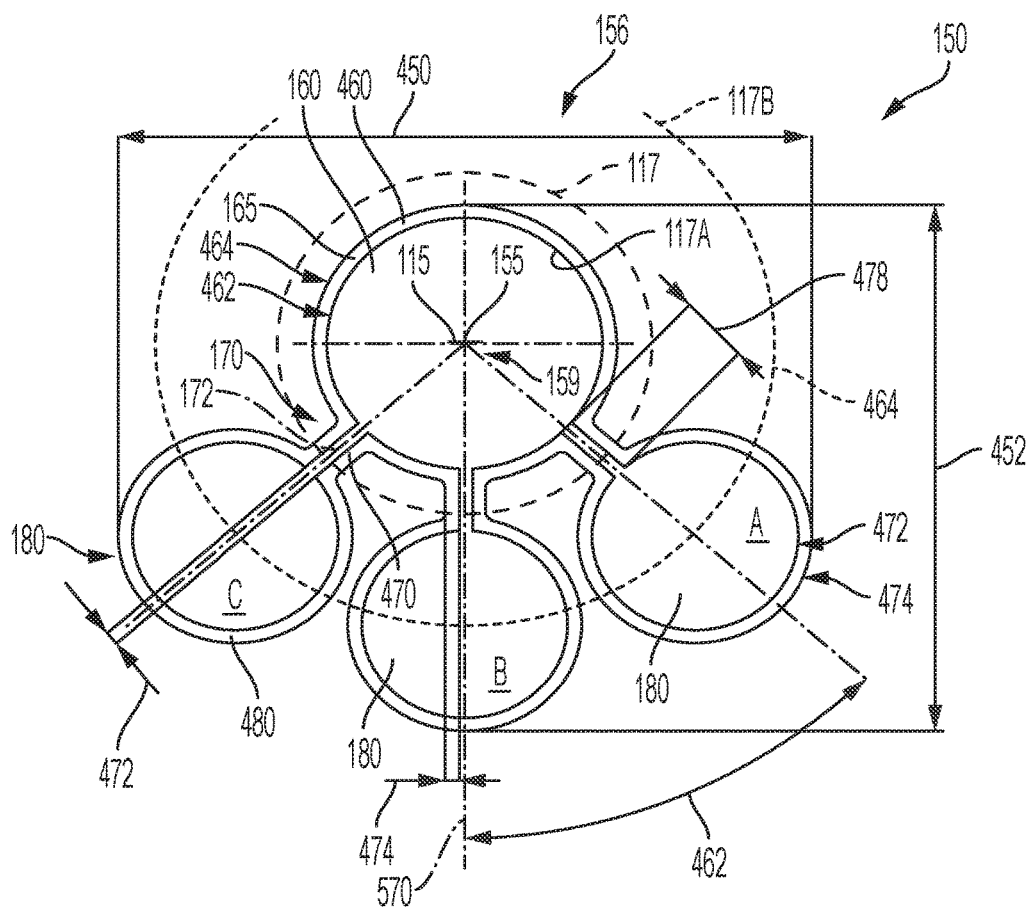
FIG. 7A shows a free standing module comprising an inner optical chamber and a plurality of eyelid engaging outer chambers in accordance with embodiments.

FIG. 7A shows a free standing module 150 comprising an inner optical chamber 160 and a plurality of eyelid engaging outer chambers 180. A support structure 165 such as a flange 460 extends around the optical chamber 160 and may extend around each of the eyelid engaging chambers 180 and the extensions 170. The flange 460 may comprise one or more flanges to provide support such as an extension flange 470. Each of the flanges extends from a first inner location 472 to a second outer location 474, so as to define a width of the flange. For example, the flanges 460 of the optical chamber can extend from a first inner location 462 to a second outer location 464, so as to define a width of the flange.

The contact lens 100 and module 150 each comprises optical components that can be arrange in one or more of many ways. In many embodiments, the module 150 comprises an optical center 155 located along an optical axis 157 of the optical chamber 160. The optical center 155 comprises an optical center of the optical chamber 160. The optical center 155 may comprise a location along optical axis 157 extending through a center of the support structure 165 and vertex of the upper membrane 162 when the optical chamber 160 comprises increased curvature to provide additional optical power, for example.

The module 150 comprises a maximum lateral dimension across 450, and a maximum vertical dimension across 452, as may be defined when the user stands, for example.

Figure 7B:
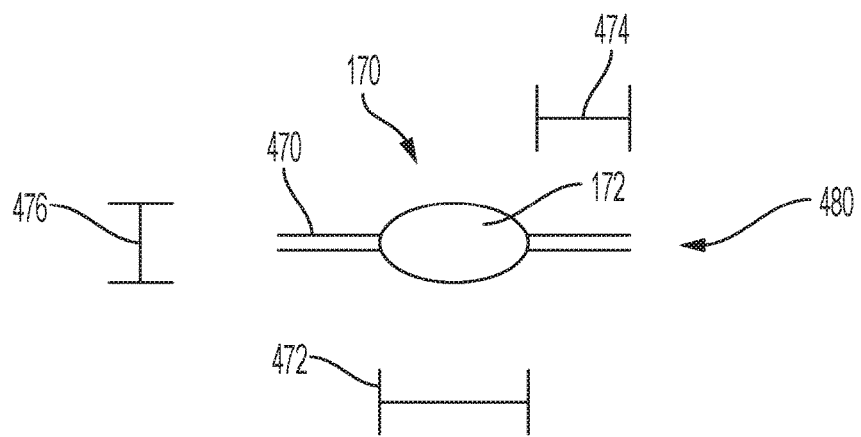
FIG. 7B shows cross-sectional view of an extension and a support flange, in accordance with embodiments.

FIG. 7B shows cross-sectional view of an extension and a support flange.

The channel 172 can be shaped in one or more in many ways and comprises a cross sectional width 472. The channel 170 comprises a height 476. In many embodiments, the height 476 is less than the width 472.

The optical correction zone 117 of the contact lens 100 can be configured in one or more of many ways as disclosed herein, so as to provide beneficial vision to the subject. The optical correction zone 117 comprises a zone of the contact lens 100 that provides desired optical correction of the subject, such as far vision correction, for example. In many embodiments, the optical correction zone 117 is sized in relation to the pupil of the subject, which can vary with age and lighting, and a person of ordinary skill in the art can determine an appropriate size of the optical correction zone 117 based on the teachings provided herein. The optical correction zone 117 can be sized within a range from smaller than the inner diameter 161 of chamber 160 to larger than a dimension covering the module 150. In many embodiments, the optical correction zone 117 comprises a dimension, such as a diameter, sized within a range from about the diameter of the optical correction zone 160 to a diameter covering the one or more eye engaging chambers 180. In many embodiments, the eye optical correction zone 117 comprises a diameter sized so that the outer boundary extends through the one or more extensions 170 when the center of the optical correction zone is aligned within the optical module, for example when axis 115 is aligned with the center 155 of the module. In many embodiments, the eye optical correction zone 117 comprises a diameter sized so that the outer boundary extends through the one or more eye engaging members 180 when the center of the optical correction zone 117 is aligned within the optical module 180, for example when axis 115 is aligned with the center 155 of the module.

In many embodiments, the optical correction zone 117 is sized such that the optical correction zone extends over one or more anchors as described herein.

The structure of the module 150 can be symmetrically disposed about a midline 570, so as to inhibit gravitationally induced rotation of the module, for example when the subject stands. In many embodiments, the midline 570 is arranged for placement on the contact lens such that the midline 570 is aligned to the known 90 degree axis of the cornea of the eye, for example.

While each of the flanges can be shaped in one or more of many ways, in many embodiments the flange 470 comprises a width 474 extending from an interior of the channel 172. The flanges of each of the optical chamber 160 and one or more chambers 180 can be similarly formed.

In many embodiments, each of flanges comprises an upper flange of an upper membrane and a lower flange of a lower membrane. The flange of the upper membrane can be boned to the flange of the lower membrane to define the optical chamber 160, the one or more extensions 170 and the one or more outer chambers 180, for example. The lower membrane can be thicker than the upper membrane to encourage greater movement of the upper membrane than the lower membrane The bonding of the upper flange to the lower flange can be performed in one or more of many ways, such that the lower flange and upper flange are joined, for example joined securely, to each other, in many embodiments by means of an adhesive substance, heat, or pressure and may comprise one or more of welding, adhesive, or pressure, for example.

In many embodiments the module may comprise a first sheet of material bonded to a second sheet of material in order to define the support structure 165 comprising the flange, for example.

FIG. 7C shows soft accommodating contact lens 100 comprising module 150 encapsulated in the soft contact lens material 110, and optical structures of the contact lens and module, in accordance with embodiments. In many embodiments, the module 150 is embedded in the soft contact lens material. The contact lens may comprise an optical correction zone 117 to provide far vision correction to the subject, and may correct one or more of spherical refractive error, astigmatism, myopia or hyperopia of the subject, for example. In many embodiments, the center of the optical correction zone 117 comprises a center located along an optical axis 115 of the accommodating contact lens 110. The optical correction zone 117 may comprise an anterior surface 116 of the contact lens 100 and a posterior surface 118 of the contact lens, in which the anterior and posterior surfaces comprise profiles configured to provide a far vision correction of the subject when the one or more eyelid engaging chambers 180 do not engage the eyelid of the subject. For example, the posterior surface of the contact lens 118 can be provided so as to fit the cornea of the subject, and the anterior surface 116 can be configured to provide the intended far vision of the subject when combined with the posterior surface.

In many embodiments, the module 150 comprises an accommodation correcting optical zone defined with an inner dimension such of the support structure 165, such as an inner diameter 161 of the optical chamber 160, in order to provide near vision correction within the optical zone 117 of the contact lens 100. The optical center 155 of the module 150 is located along an optical axis of 157 of the optical chamber 160. In many embodiments, the optical axis 115 of the contact lens is coaxial with the optical axis 155 of the module, and the optical center of the contact lens may be collinear with the optical center of the optical chamber. Alternatively, the optical center 155 of the module 150 can be displaced from the optical center of the contact lens. For example, the optical center 155 of the module can be displaced inferiorly, or nasally, or both, in relation to the optical center of the contact lens, for example.

The material 110 of the contact lens 100 can be arranged over the module 150 in one or more of many ways to provide accommodating vision for the subject such as a consumer. In many embodiments, the soft contact lens material 110 encapsulates the module 150 so as to inhibit perceptible visual artifacts of the contact lens 100. In many embodiments, the contact lens material and materials of the module comprise similar indices of refraction so as to inhibit visual artifacts that might otherwise be perceptible to the user. For example, the anterior membrane 162 of the central optical chamber 160 may comprise a curvature greater than the curvature of the anterior surface of the optical correction zone 117 of the lens, and the indices of refraction of the membrane 162 and the soft contact lens material 110 can be substantially similar, such that light passing through the interface of the contact lens material 110 and membrane 162 is not substantially refracted by the interface.

In many embodiments, the thickness profiles of the contact lens module, the anterior contact lens material, and the posterior contact lens material can be combined so as to provide the optical correction zone 116 of the lens 100. In many embodiments, the soft contact lens material 110 encapsulating module 150 comprises a varying thickness profile between the module 150 and one or more of the anterior ("upper") surface 116 and posterior ("lower") surface 118 in order to provide the intended refraction. In many embodiments, the module 150 comprises an anterior face such as an anterior surface 156 and a posterior face such as posterior surface 158. In many embodiments, the module 150 comprises a varying thickness profile extending between anterior surface 156 and posterior surface 158. A thickness profile of the contact lens material 110 extending between the anterior surface 116 of the lens 110 and the anterior surface 156 of the module 150 varies so as to provide optical correction of the subject with the anterior surface 116. A thickness profile of the contact lens material 110 extending between the posterior surface 118 of the lens 110 and the posterior surface 158 of the module 150 varies so as to provide optical correction of the subject with the posterior surface 118.

The soft contact lens material 110 may cover the module 110 with a configuration that provides optical irregularities outside of the optical zone 117 in order to inhibit visual artifacts. For example, the contact lens 100 may comprise a configuration that produces a slight bulge over the eyelid engaging chamber 180, and the eyelid engaging chamber can be located outside of the optical zone 117 of the contact lens 100 such that light passing through the eyelid engaging chamber is substantially occluded by the iris of the eye.

FIG. 7D shows a contact lens 100 comprising a far vision correction configuration, in which the optical correction zone 117 extends over the optical chamber 160 and the one or more extensions 170, and at least partially over the one or more eye engaging chambers 180. The contact lens material 110 comprises: an anterior varying thickness profile extending between the anterior surface 116 and the anterior surface 156, a posterior varying thickness profile extending between the posterior surface 118 and the posterior surface 158, in response to an intermediate varying thickness profile extending between the anterior surface 156 and the posterior surface 158, in order to provide optical correction with optical correction zone 117. Light rays refracted by the anterior surface that extend through the one or more eye engaging chambers 156 provide an optical correction of the subject, which may comprise a far vision correction, for example.

The varying thickness profiles and substantially similar indices of refraction allow complex module structures to be encapsulated within the contact lens material 110 in a manner that inhibits visual artifacts.

The contact lens 100 may comprise an anterior surface 116 flatter than posterior surface 118 as shown in FIG. 7D, in order to provide distance vision correction to a near sighted subject. A person of ordinary skill in the art will recognize that the curvatures as shown in FIG. 7D are not shown according to scale in order to illustrate structure of the optical correction zone and outer peripheral zone. The outer peripheral zone of the anterior surface may comprise a steeper curvature than the surface 116 of the optical correction zone.

FIG. 7E shows the one or more eye engaging chambers 180 in an uncompressed configuration, in accordance with embodiments. The upper and lower membranes in the uncompressed configuration may comprise one or more of a convex curvature, a concave curvature, and combinations thereof. In many embodiments, the anterior membrane of the chamber 180 comprises a thickness greater than the posterior membrane of the chamber 180, and the anterior membrane of the chamber 180 comprises a thickness greater than an anterior membrane of the optical chamber 160, in order to inhibit aberrations of the one or more peripheral chambers.

FIG. 7F shows the one or more eye engaging chambers 180 in a compressed configuration, in accordance with embodiments. The upper and lower membranes in the compressed configuration may comprise one or more of a convex curvature, a concave curvature, and combinations thereof, such that the volume of the compressed chamber comprises an amount less than the volume of the uncompressed chamber.

Figure 8:
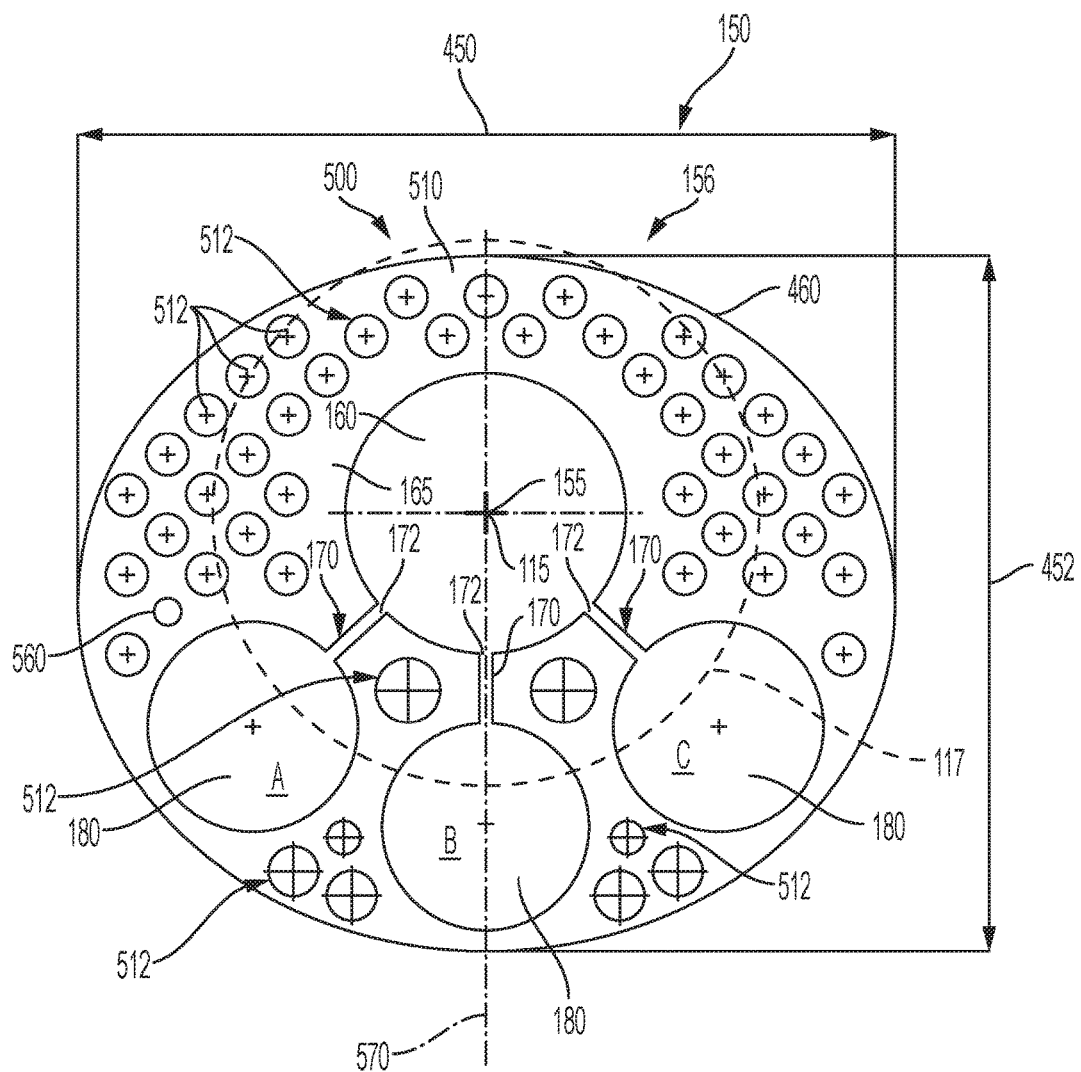
FIG. 8 shows a free standing module comprising an inner optical chamber and a plurality of outer eyelid engaging chambers, in which the module has an anchor comprising a flange with a plurality of openings to hold the module in the contact lens, in accordance with embodiments.

FIG. 8 shows a free standing module 150 comprising an inner optical chamber 160 and a plurality of outer eyelid engaging chambers 180, in which the module has an anchor 500 comprising a flange 510 with a plurality of openings 512 to hold the module in the contact lens. The module can be dimensioned so as to comprise an oval outer perimeter, for example, as defined with dimension 450 and dimension 452, for example. In many embodiments, the free standing module 150 is self-supporting such that the entire module can be lifted by grasping one of the components of the module.

An indicia of alignment such as a marker 560 can be provided with the module 150 in order to properly orient the module with respect to the contact lens during manufacturing. For example, the module 150 may comprise a thicker lower membrane and a relatively thinner lower membrane as described herein, and the marker 560 can be placed on one side of the midline, such as the left side when viewed toward the upper surface of the module to indicate that the upper thinner face of the module is properly oriented. Alternatively or in combination, the anchor may comprise a structure to indicate the alignment of the module 150.

Figure 9:
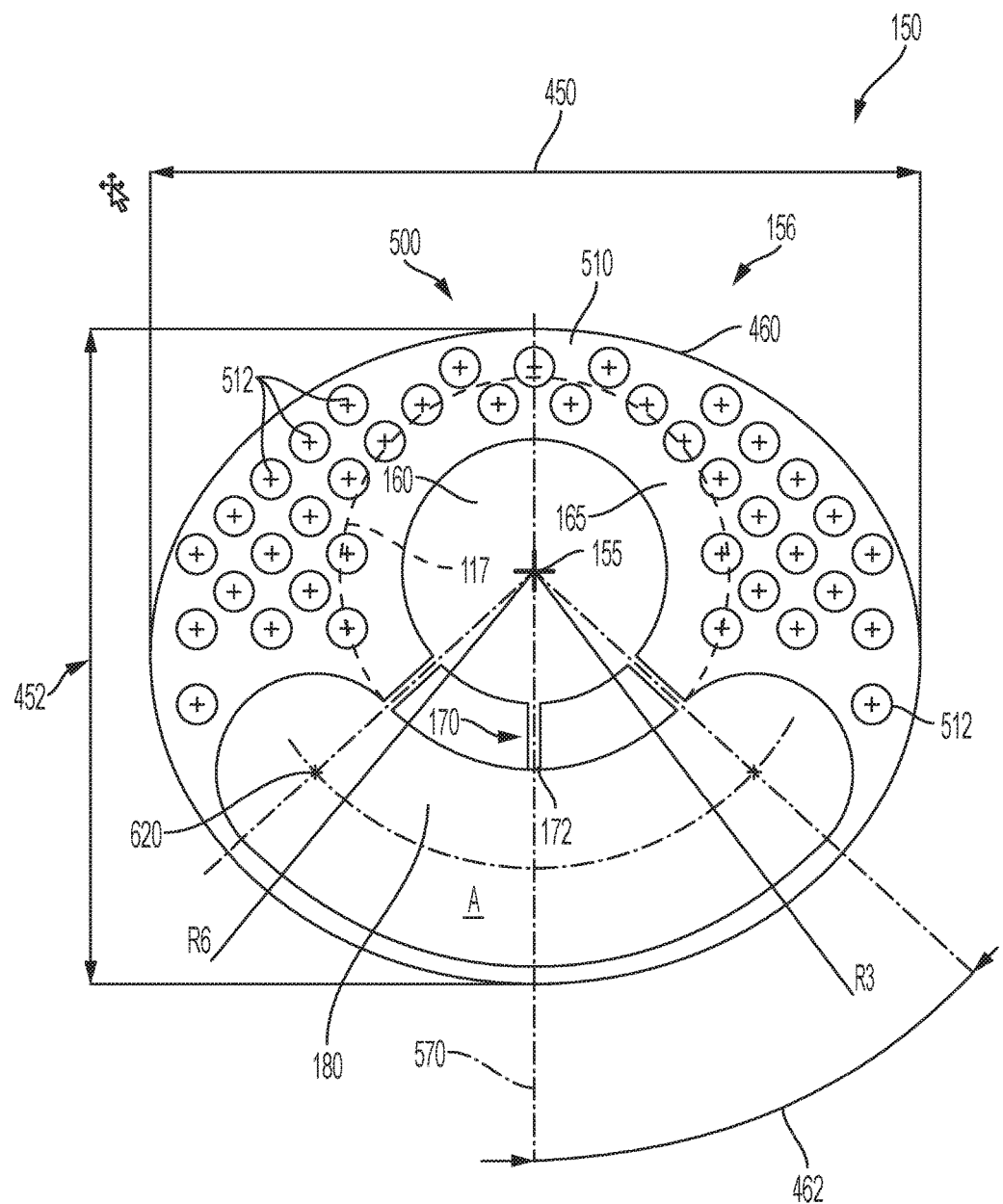
FIG. 9 shows a free standing module comprising an inner optical chamber and an outer arcuate eyelid engaging chamber, in which the module has an anchor comprising a flange with a plurality of openings to hold the module in the contact lens, in accordance with embodiments.

FIG. 9 shows a free standing module 150 comprising an inner optical chamber 160 and an outer arcuate eyelid engaging chamber 180, in which the module has an anchor 500 comprising a flange 510 with a plurality of openings 512 to hold the module in the contact lens. The arcuate eyelid engaging chamber comprises an angular dimension 462, and a radius 620 defining and end portion.

Although an anchor comprising a plurality of openings is shown, the anchor may comprise one or more of many structures providing an increase surface area, for example, such as a brush or screen, for example.

Figure 10:
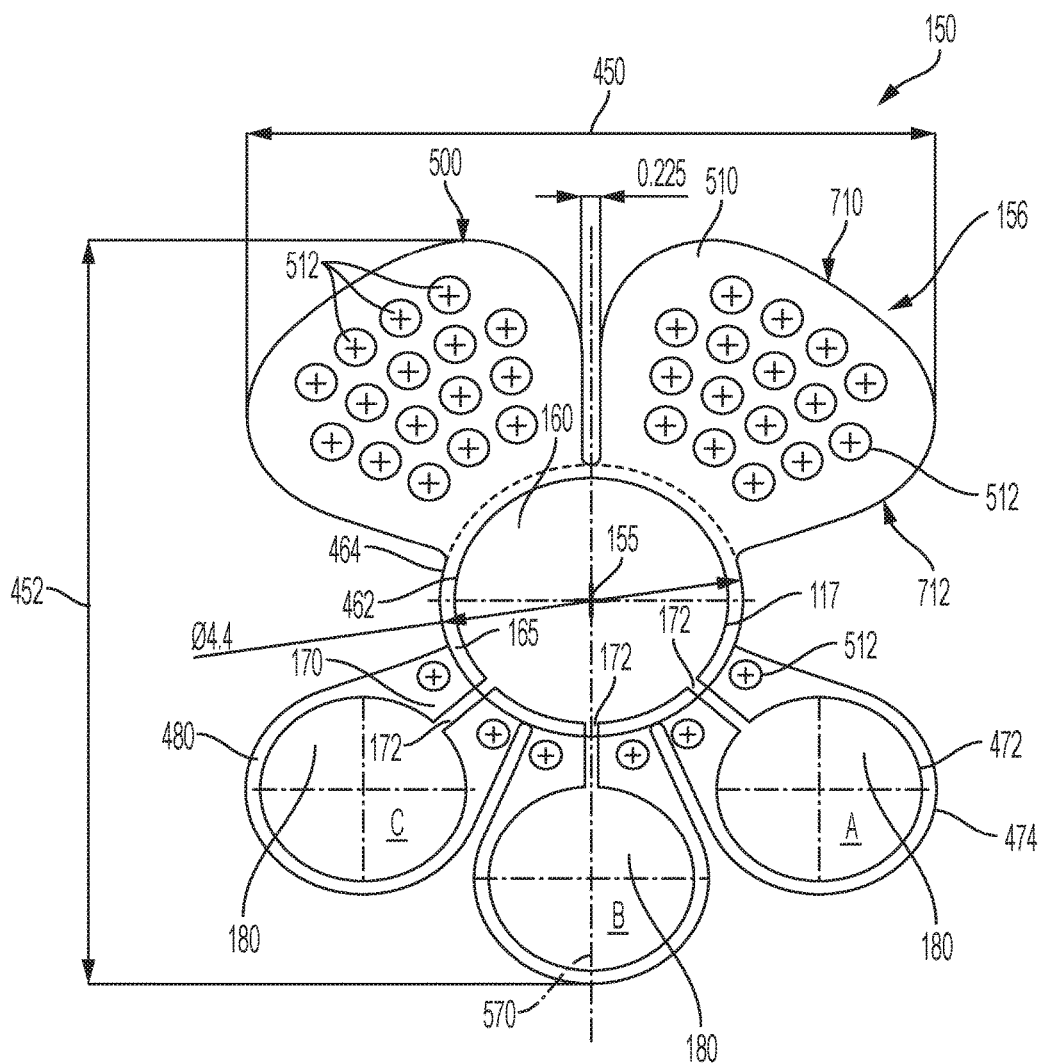
FIG. 10 shows a free standing module comprising an inner optical chamber and a plurality of outer eyelid engaging chambers, in which the module has an anchor comprising a flange with a plurality of openings to hold the module in the contact lens, in accordance with embodiments.

FIG. 10 shows a free standing module 150 comprising an inner optical chamber 160 and a plurality of outer eyelid engaging chambers 180, in which the module 150 has an anchor 500 comprising a plurality of flanges 510 with a plurality of openings 512 to hold the module in the contact lens 150. The anchoring flanges can be shaped in one or more of many ways and may comprise a plurality of lobes, for example. Each of the lobes may comprise a first radius 710 and a second shorter radius 712, for example.

The soft material of the soft accommodating contact lens in which the module is encapsulated, for example embedded, may comprise one or more of many known soft commercially available materials such as one or more of a hydrogel, silicone, siloxane, silicone hydrogel, galyfilcon A, senofilcon A, Comfilcon A, Enfilcon A, polyacrlate.

Figure 11:
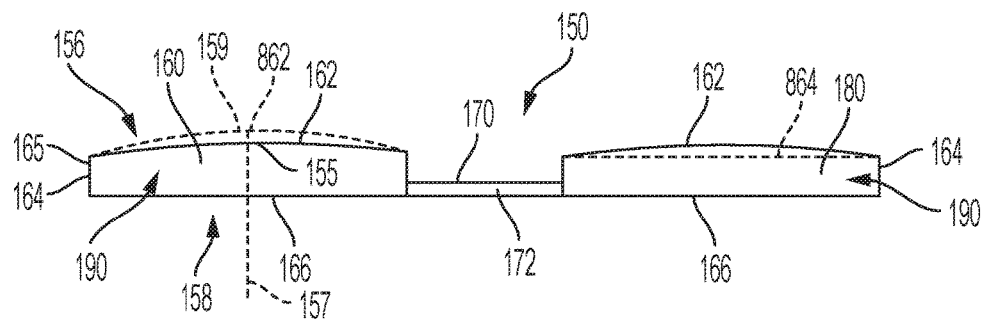
FIG. 11 shows a pressurized accommodating module, in accordance with embodiments.

FIG. 11 shows a free standing pressurized accommodating module 150, suitable for combination in accordance with embodiments described herein. The module 150 can be pressurized with fluid 190 in order to decrease hysteresis and improve responsiveness of the module. In the free standing unloaded configuration, the upper membrane 162 of the optical chamber 160 and the upper membrane 162 of eye engaging chamber 180 may each comprise a slightly convex outward curvature in response to the pressurization. When the eyelid engages the membrane 162 of the one or more chambers 180, the membrane is urged downward toward the lower membrane 166 so as to drive fluid 190 into optical chamber 160. In response to the addition fluid 190 in chamber 160, the upper membrane 162 comprises an increased curvature 862 so as to provide additional optical power for one or more of intermediate or near vision as disclosed herein. The membrane 162 may comprise a vertex 159 in the curved configuration as described herein. As the module 150 may comprise one or more support structures as disclosed herein, the pressurization can result in opposing forces directed to each upper membrane such that each membrane comprises an elastic deformation in the free standing unloaded configuration so as to provide improved responsiveness of the module. The elastic membrane deflections and corresponding opposing forces may comprise an equilibrium configuration of the opposing elastic forces of the membranes, for example.

The module and anchors as described herein are well suited for combination of the lens module with a hydrogel contact lens material, for example. In many embodiments, the module comprises a stiffness greater than the contact lens material, and the anchors allow the module to be retained within the contact lens when the contact lens is deflected, for example bent, without the module rupturing the contact lens material. In many embodiments, the module comprises a first non-hydrogel material such as a plastic, and the contact lens material comprises a hydrogel, and the anchors facilitate retention of the module in the contact lens material when the hydrogel material expands or contracts and the module comprises substantially fixed dimensions.

Figure 12:
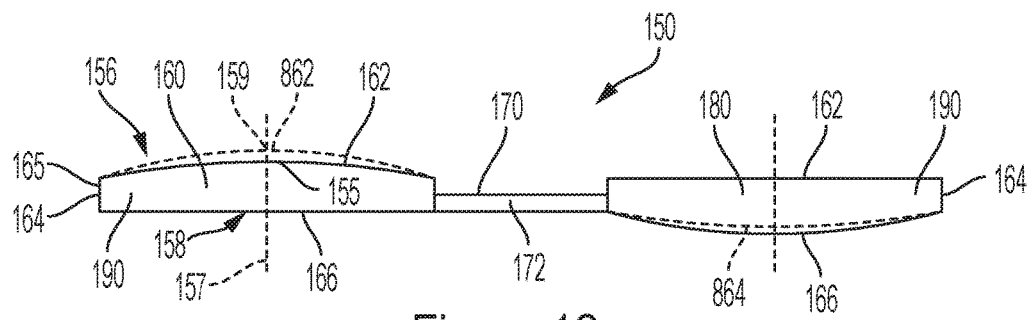
FIG. 12 shows a pressurized accommodating module comprising an optical chamber having an anterior surface configured to deflect and one or more eyelid engaging chambers comprising a posterior surface configured to deflect, in accordance with embodiments.

FIG. 12 shows a pressurized accommodating module 150 comprising an optical chamber 160 having an anterior surface membrane 162 configured to deflect and one or more eyelid engaging chambers 180 comprising a posterior surface membrane 166 configured to deflect when the eyelid engages the one or more eyelid engaging chambers 180. The posterior surface membrane 166 of the optical chamber 160 comprises a thickness greater than the anterior surface membrane 162 of the optical chamber in order to inhibit deflection of the posterior surface and provide deflection of the anterior surface membrane and contact lens material 110 covering the anterior surface of the module. The anterior surface membrane 162 of the one or more eyelid engaging chambers 180 comprises a thickness greater than the posterior surface membrane 166 of the one or more eyelid engaging chambers 180 in order to inhibit deflection of the anterior surface and provide deflection of the posterior surface membrane and contact lens material 110 covering the posterior surface of the module.

Figure 13:
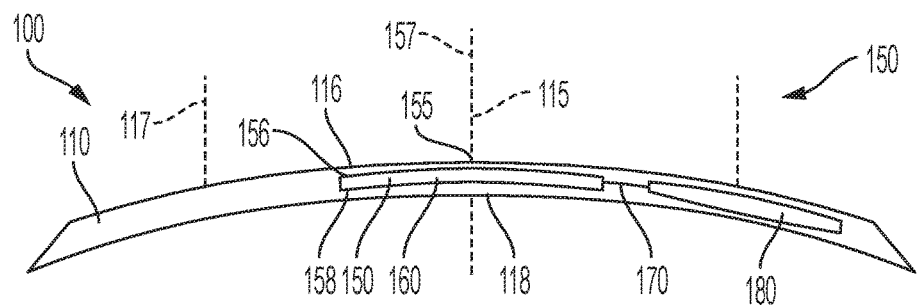
FIG. 13 shows an accommodating contact lens comprising module as shown in FIG. 12, in which the contact lens material comprises an anterior thickness profile and a posterior thickness profile to provide optical correction with optical correction zone in order to inhibit optical artifacts , in accordance with embodiments.

FIG. 13 shows an accommodating contact lens 100 comprising module 150 as shown in FIG. 12, in which the contact lens material 110 comprises an anterior thickness profile and a posterior thickness profile to provide optical correction with optical correction zone 117 in order to inhibit optical artifacts as described herein.

Figure 14:
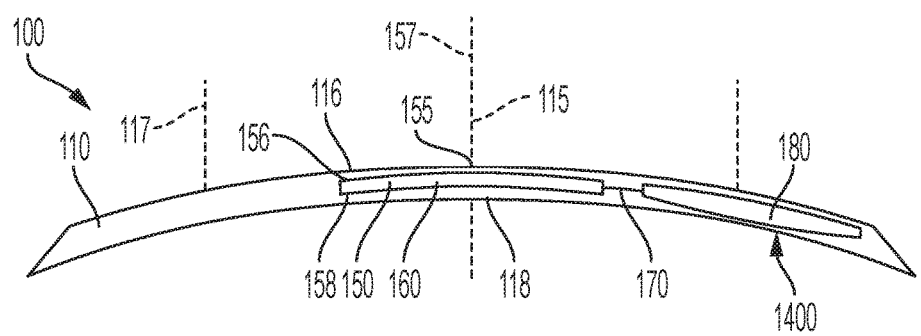
FIG. 14 shows an accommodating contact lens comprising module as shown in FIG. 12, in which the contact lens material comprises an anterior thickness profile and a posterior thickness profile to provide optical correction with a majority optical correction zone, and a protrusion of the posterior surface to inhibit aberrations of the protrusion, in accordance with embodiments.

FIG. 14 shows an accommodating contact lens 100 comprising module 150 as shown in FIG. 12, in which the contact lens material 110 comprises an anterior thickness profile and a posterior thickness profile to provide optical correction with a majority optical correction zone 117, and a protrusion 1400 of the posterior surface 118 to inhibit aberrations of the protrusion. Protrusion 1400 comprises a protrusion from the cornea fitting base curve of the posterior surface of accommodating contact lens 100. The deflection of the posterior surface of the contact lens provides decreased aberrations and visual artifacts, as compared with a similar protrusion on the anterior surface, as the index of refraction of the tear film, about 1.336, occupying a space between the anterior surface of the cornea and the posterior surface of the lens comprises an index of refraction closer to the index of refraction of the material of the protrusion than the index of refraction of air, about 1.0003. In at least some embodiments, the protrusion may provide a slight tilt to the lens when placed on the cornea, which tilt may provide an imperceptible visual change to the subject in the optical quality of the image while allowing the lower surface to engage the cornea and eyelid in order to increase the curvature of the central optical chamber as described herein.

The mold as described herein can be configured to provide the protrusion 1400. For example, the upper mold can be machined to provide protrusion 1400 and the optically corrective zone 117, for example.

The mold can be combined with the one or more methods described herein in order to provide the accommodating contact lens as described herein.

Figure 15A:
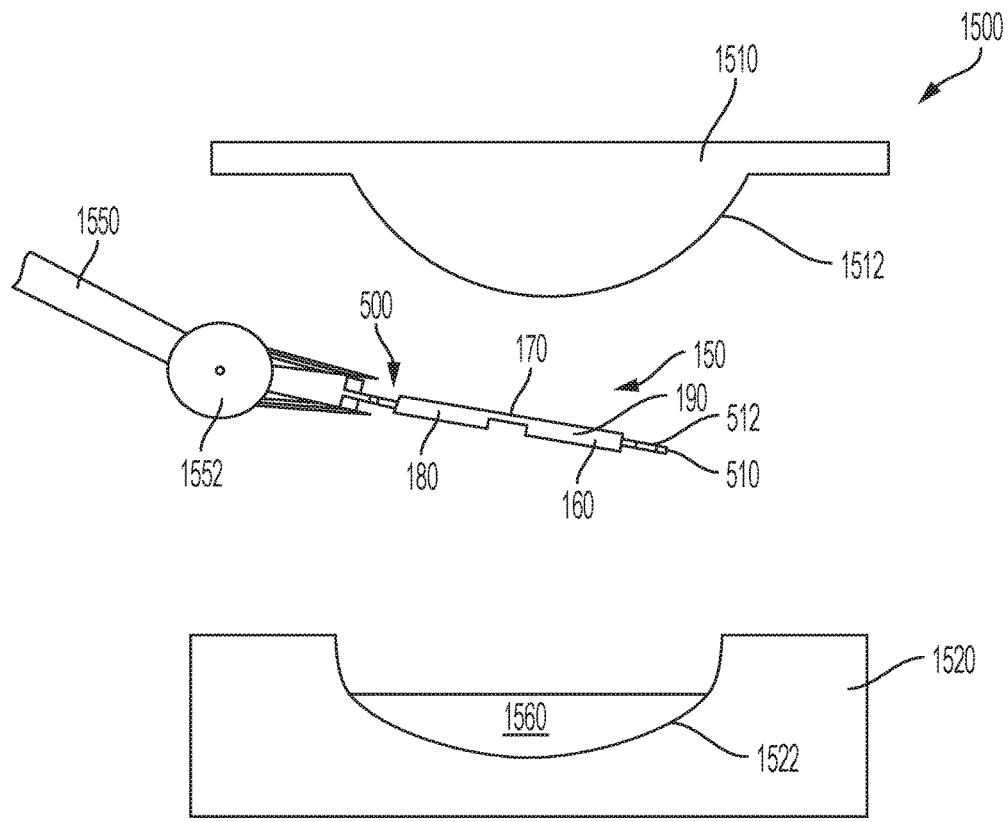
FIG. 15A shows upper and lower components of a mold, a self-supporting module, a precursor material and a robotic end effector, in accordance with embodiments.

FIG. 15A shows an upper male component 1510 and lower female component 1520 of a mold 1500, a self-supporting module 150, a precursor material 1560, and an end effector 1552 of a robot 1550. The upper male component 1510 comprises a convex surface 1512 having a shape profile comprising a base curvature corresponding to a shape profile of the cornea on which the accommodating contact lens may be placed. The lower female component 1520 comprises a concave surface 1522 having a shape profile corresponding to an optically corrective shape of the optical correction zone 117 of the accommodating contact lens in order to correct far vision optical error of the eye such as a refractive error of the eye. The precursor material 1560 comprises a precursor material as described herein.

The module 150 comprises the optical chamber 160, the one or more eye engaging chambers 180, the one or more extensions 170, and the module fluid 190. The module 150 may comprise one or more anchors 500 comprising a flange 510 having a plurality of openings 512. The module 150 is provided on the lower female mold with the robotic arm.

The module 150 can be dipped in a precursor material having an appropriate viscosity as described herein prior to placement in the precursor material 1560. Alternatively or on combination, the precursor material 1560 may comprise an appropriate viscosity to form the anterior thickness profile between the upper concave surface of the lower female mold and the anterior surface of the module, for example.

The module 150 can be treated prior to placement in the mold to provide a wettable exterior surface of the module, for example with plasma treatment to form hydroxyl groups on the exterior surface of the module such as with a silane or a siloxane, for example.

The upper component 1510 can be advanced toward the lower component in order to engage the lower component.

Figure 15B:
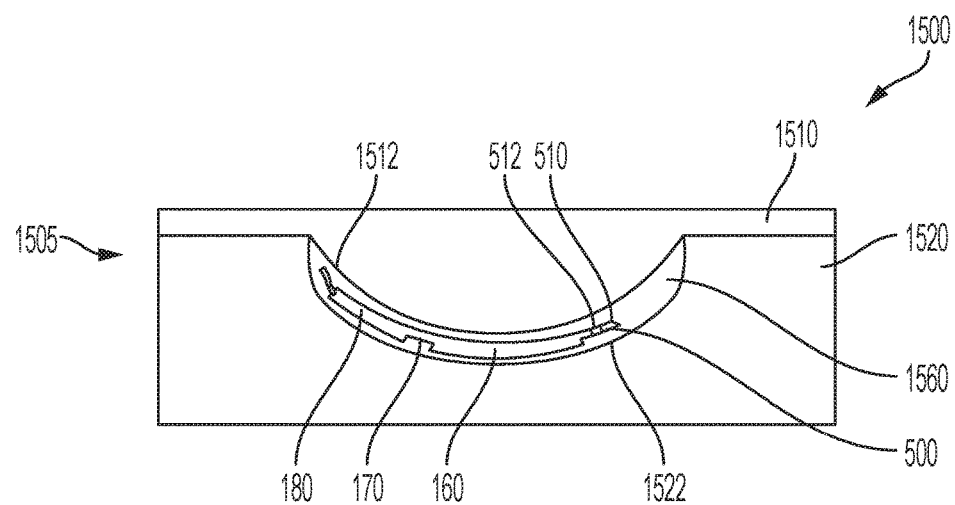
FIG. 15B shows the mold as in FIG. 15A in a mating configuration, in which the module has settled toward the lower surface of the mold in the precursor material.

FIG. 15B shows the mold 1500 as in FIG. 15A in a mating configuration 1505, in which the module 150 has settled toward the lower surface 1522 of the mold in the precursor material 1560. The precursor material 1560 can be cured when the mold comprises the mating configuration, in order to encapsulate the module 150 with the soft contact lens material 110. The lens can be released from the mold, packaged, and provided to the eye with one or more steps as described herein.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of manufacturing an accommodating contact lens, the method comprising:
    providing an accommodating contact lens module; and
    encapsulating the accommodating contact lens module in a soft contact lens material,
    wherein an optically transmissive coupling fluid has been placed in the accommodating contact lens module prior to encapsulating the module,
    wherein the mold comprises a shape to form an optical correction zone for a subject on corresponding anterior and posterior surfaces of the accommodating contact lens, and
    wherein the accommodating contact lens module and the optically transmissive fluid placed therein comprise an index of refraction similar to an index of refraction of the soft contact lens material in order to transmit light refracted by the anterior and posterior surfaces of the optical correction zone through at least a portion of the module and inhibit optical artifacts,
    wherein the accommodating contact lens module comprises an optical chamber, a support structure, one or more eyelid engaging chambers, and one or more extensions comprising a fluidic channel extending between the optical chamber and the one or more eyelid engaging chambers, and
    wherein the optical chamber comprises an anterior membrane having an anterior thickness and a posterior membrane having a posterior thickness, the posterior thickness greater than the anterior thickness, wherein the accommodating contact lens module contains an amount of fluid within a range from 0.15 to 2.5 microliters and the central optical chamber provides 2 Diopters of add power with an amount of fluid within a range from 0.07 to 0.30 microliters in response to eyelid pressure to the one or more eyelid engaging chambers.

2. A method as in claim 1, wherein the accommodating contact lens module is placed in the mold with a thin layer of precursor material extending between an anterior surface of a membrane of an optical correction chamber of the accommodating contact module and a lower concavely curved surface of the mold.

3. A method as in claim 1, wherein the free standing, accommodating contact lens module comprises the optical chamber, the support structure, the one or more eyelid engaging chambers, the one or more extensions extending between the optical chamber and the one or more eyelid engaging chambers, and the anchor, and wherein the free standing, accommodating contact lens module is configured such that the optical chamber, the support structure, the one or more eyelid engaging chambers, the one or more extensions extending between the optical chamber and the one or more eyelid engaging chambers, and the anchor are connected to each other prior to placement in the mold such that the free standing, accommodating module is self-supporting module and capable of being lifted and placed in the mold by grasping the one or more of the optical chamber, the one or more eyelid engaging chambers, the one or more extensions extending between the optical chamber, the one or more eyelid engaging chambers, or the anchor.

4. A method as in claim 3, wherein the accommodating contact lens module is grasped by an end effector of a robot.

5. A method as in claim 1, wherein the one or more eyelid engaging chambers comprises an anterior membrane having an anterior membrane thickness greater than a posterior membrane thickness of the one or more eyelid engaging chambers.

6. A method as in claim 5, wherein an anterior surface of the anterior membrane of the optical chamber comprises a convex curvature and a posterior surface of the posterior membrane of the one or more chambers comprises a convex surface.

7. A method as in claim 1, wherein module comprises the anchor and the anchor comprises a flange comprising a plurality of openings and wherein the plurality of openings is placed in the mold.

8. A method as in claim 1, wherein the fluid is pressurized within the module when the accommodating contact lens module has been placed in the mold.

9. A method as in claim 1, wherein the optical chamber of the accommodating contact lens module comprises an optical power when placed in the mold and wherein the optical power is inhibited by the soft contact lens material with the accommodating contact module encapsulated within the contact lens material.

10. A method as in claim 9, wherein the optical chamber comprises a convexly curved anterior surface of an anterior membrane when the accommodating contact lens module has been placed in the mold.

11. A method as in claim 10, the anterior membrane comprises an elastic deflection and wherein the elastic deflection pressurizes the optically transmissive coupling fluid when the module has been placed in the mold.

12. A method as in claim 1, wherein providing the accommodating contact lens module comprises
connecting an optical chamber to one or more eyelid engaging chambers with one or more extensions extending between the optical chamber and the one or more eyelid engaging chambers.

13. An apparatus to manufacture an accommodating contact lens, the apparatus comprising:
an accommodation module comprising a free standing module configured to be encapsulated in a soft contact lens material and having an optically transmissive coupling fluid placed therein prior to being encapsulated; and
a mold,
wherein the accommodation module is configured to be placed in the mold, the mold comprising a shape to form an optical correction zone for a subject on corresponding anterior and posterior surfaces of the accommodating contact lens,
wherein the accommodation module and the optically transmissive fluid placed in the accommodation module comprises an index of refraction similar to an index of refraction of the soft contact lens material in order to transmit light refracted by the anterior and posterior surfaces of the optical correction zone through at least a portion of the module and inhibit optical artifacts,
wherein the accommodation module comprises an optical chamber, a support structure, one or more eyelid engaging chambers, one or more extensions comprising a fluidic channel extending between the optical chamber and the one or more eyelid engaging chambers,
wherein the accommodation module contains an amount of fluid within a range from 0.15 to 2.5 microliters and the central optical chamber provides 2 Diopters of add power with an amount of fluid within a range from 0.07 to 0.30 microliters in response to eyelid pressure to the one or more eyelid engaging chambers, and
wherein the optical chamber comprises an anterior membrane having an anterior thickness and a posterior membrane having a posterior thickness, the posterior thickness greater than the anterior thickness.

* * * * *